United States Patent
Quackenbush et al.

(10) Patent No.: US 9,429,071 B2
(45) Date of Patent: Aug. 30, 2016

(54) SUPERSONIC ENGINE INLET DIFFUSER WITH DEPLOYABLE VORTEX GENERATORS

(75) Inventors: Todd R. Quackenbush, Ringoes, NJ (US); Robert M. McKillip, Jr., Hopewell, NJ (US); Pavel V. Danilov, Ewing, NJ (US)

(73) Assignee: CONTINUUM DYNAMICS, INC., Ewing, NJ (US)

( * ) Notice: Subject to any disclaimer, the term of this patent is extended or adjusted under 35 U.S.C. 154(b) by 1082 days.

(21) Appl. No.: 13/454,306

(22) Filed: Apr. 24, 2012

(65) Prior Publication Data

US 2012/0325325 A1 Dec. 27, 2012

Related U.S. Application Data

(60) Provisional application No. 61/457,865, filed on Jun. 23, 2011.

(51) Int. Cl.
*F02C 7/042* (2006.01)
*F02C 7/04* (2006.01)

(52) U.S. Cl.
CPC ............ *F02C 7/04* (2013.01); *F05D 2220/80* (2013.01); *F05D 2240/127* (2013.01); *F05D 2300/505* (2013.01); *Y02T 50/672* (2013.01); *Y10T 137/0318* (2015.04); *Y10T 137/0536* (2015.04)

(58) Field of Classification Search
CPC .... F02C 7/04; F02C 7/042; Y10T 137/0536; F05D 2220/80; F05D 2240/127; B64D 2033/0226
See application file for complete search history.

(56) References Cited

U.S. PATENT DOCUMENTS

| | | | |
|---|---|---|---|
| 3,578,264 A | 5/1971 | Kuethe | |
| 3,643,676 A * | 2/1972 | Limage | F02C 7/057 137/15.2 |
| 3,991,782 A * | 11/1976 | Schwarzler | B64D 33/02 137/15.1 |
| 4,175,640 A | 11/1979 | Birch et al. | |
| 4,307,743 A * | 12/1981 | Dunn | B64D 33/02 137/15.1 |
| 4,354,648 A * | 10/1982 | Schenk | B64C 3/58 244/130 |
| 4,455,045 A | 6/1984 | Wheeler | |
| 4,487,017 A | 12/1984 | Rodgers | |

(Continued)

OTHER PUBLICATIONS

Anderson, B. H., et al., "Optimal Control of Shock Wave Turbulent Boundary Layer Interactions Using Micro-Array Actuation," Amer. Inst. of Aeronautics and Astronautics Rept. No. AIAA 2006-3197, pp. 1-11, Jun. 2006.

(Continued)

*Primary Examiner* — Phutthiwat Wongwian
*Assistant Examiner* — Eric Linderman
(74) *Attorney, Agent, or Firm* — David M. Quinlan, P.C.

(57) ABSTRACT

A flow control device generates counter-rotating vortices in the boundary layer of the flow in a supersonic inlet diffuser for an aircraft turbine engine. The flow control device comprises a flap attached to the duct wall for selective deployment, wherein it extends into the boundary layer, and retraction, wherein it lies substantially flush with the duct wall. In one embodiment an actuating mechanism comprising one or more shape-memory alloy wires moves the flap between two stable positions. In another embodiment the deployment height of the flap can be controlled as desired, preferably using a shape-memory alloy actuating mechanism. Typically, an array of plural flow control devices is disposed in the inlet duct for selective actuation according to a predetermined schedule.

17 Claims, 11 Drawing Sheets

(56) References Cited

U.S. PATENT DOCUMENTS

| | | | |
|---|---|---|---|
| 4,696,442 A | | 9/1987 | Mazzitelli |
| 5,058,837 A | * | 10/1991 | Wheeler ................... 244/200.1 |
| 5,598,990 A | * | 2/1997 | Farokhi .................. B64C 23/06 |
| | | | 244/198 |
| 5,734,990 A | * | 4/1998 | Waring .............................. 2/69 |
| 5,752,672 A | * | 5/1998 | McKillip, Jr. .......... B64C 13/50 |
| | | | 244/17.13 |
| 6,089,505 A | * | 7/2000 | Gruensfelder et al. ..... 244/53 B |
| 6,220,550 B1 | * | 4/2001 | McKillip, Jr. .......... B64C 13/50 |
| | | | 114/144 R |
| 6,345,792 B2 | * | 2/2002 | Bilanin .................. B64C 13/50 |
| | | | 114/144 R |
| 6,427,948 B1 | * | 8/2002 | Campbell .................. 244/204.1 |
| 6,497,385 B1 | | 12/2002 | Wachspress et al. |
| 6,718,752 B2 | * | 4/2004 | Nesbitt et al. ................... 60/204 |
| 7,216,831 B2 | * | 5/2007 | Wood .................... F02K 1/1207 |
| | | | 244/99.8 |
| 7,735,601 B1 | * | 6/2010 | Stieger et al. ................. 181/213 |
| 7,798,448 B2 | | 9/2010 | Bilanin et al. |
| 7,914,259 B2 | * | 3/2011 | Godsk ........................ 416/146 R |
| 8,087,250 B2 | | 1/2012 | Gutmark et al. |
| 8,434,723 B2 | * | 5/2013 | Simpson et al. .............. 244/204 |
| 8,528,601 B2 | * | 9/2013 | Dahm et al. .................. 137/809 |
| 8,651,142 B2 | * | 2/2014 | Sellers et al. ................... 138/45 |
| 8,881,500 B2 | * | 11/2014 | Gutmark et al. ............... 60/247 |
| 2002/0066268 A1 | * | 6/2002 | Papamoschou ........... F02K 1/36 |
| | | | 60/262 |
| 2002/0190164 A1 | | 12/2002 | Loth et al. |
| 2005/0274103 A1 | * | 12/2005 | Prasad et al. ................. 60/226.1 |
| 2006/0101807 A1 | * | 5/2006 | Wood et al. ..................... 60/262 |
| 2009/0155067 A1 | * | 6/2009 | Haas ......................... 415/208.1 |
| 2009/0320486 A1 | * | 12/2009 | Gutmark et al. ............... 60/770 |
| 2010/0018212 A1 | * | 1/2010 | Core ................................. 60/771 |
| 2010/0115914 A1 | * | 5/2010 | Levasseur ....................... 60/204 |
| 2010/0146932 A1 | * | 6/2010 | Webster ........................... 60/204 |
| 2010/0288379 A1 | | 11/2010 | Dahm et al. |
| 2011/0000548 A1 | * | 1/2011 | Sanders ................. B64D 33/02 |
| | | | 137/1 |
| 2011/0030337 A1 | * | 2/2011 | Mons .......................... 60/226.1 |
| 2011/0030380 A1 | * | 2/2011 | Widdle et al. ................... 60/771 |
| 2011/0095135 A1 | * | 4/2011 | Miller et al. ............... 244/200.1 |
| 2011/0138814 A1 | * | 6/2011 | Rupp et al. ....................... 60/772 |
| 2011/0315248 A1 | * | 12/2011 | Simpson ................. F15D 1/003 |
| | | | 137/561 R |
| 2012/0018021 A1 | * | 1/2012 | Babinsky .................. F15C 1/16 |
| | | | 137/808 |
| 2012/0211599 A1 | * | 8/2012 | Morvant et al. ............... 244/1 N |
| 2014/0196436 A1 | * | 7/2014 | Watanabe ............... F02C 7/042 |
| | | | 60/204 |
| 2014/0338324 A1 | * | 11/2014 | Jasklowski ........... F02K 1/1207 |
| | | | 60/527 |

OTHER PUBLICATIONS

Fonda, R.W., et al., "Crystallography and Microstructure of TaRu,"Philos. Mag. A., vol. 76, No. 1, pp. 119-133, 1997.

Fonda, R.W., et al., "The Shape Memory Effect in Equiatomic TaRu and NbRu Alloys," Scripta Materialia, vol. 39. No. 8, pp. 1031-1037, 1998.

Herges, T., et al., "Micro-Ramp Flow Control on Normal Shock/Boundary Later Interactions," Amer. Inst. of Aeronautics and Astronautics Rept. No. AIAA 2009-920, pp. 1-21, Jan. 2009.

Maclean, B.J., et al., "A Shape Memory Actuated Complaint Control Surface," SPIE Smart Structures and Materials 1993: Smart Structures and Intelligent Systems, Albuquerque, NM, SPIE, vol. 1917,1993.

Noebe, R.D., et al., "Processing of Ni30Pt20Ti50 High Temperature Shape-Memory Alloy into Thin Rod," http;//www.grc.nasa.gov/WWW/RT/2004/RM/RM 14M-noebe2.html (2005).

Quackenbush T.R., et al., "Design, Fabrication, and Test Planning for an SMA-Actuated Vortex Wake Control System," Proc. of the SPIE Industrial and Commercial Applications of Smart Structures Technologies Meeting, SPIE, pp. 259-271, 1998.

Quackenbush T.R., et al., "Test Results for an SMA-Actuated Vortex Wake Control System," SPIE Conference on Industrial and Commercial Applications of Smart Structures Technologies, Newport Beach, CA, SPIE vol. 3674, pp. 84-94,1999.

Quackenbush T.R., et al., "Novel Turning Device Via Smart Material Technology," Final Report to the U.S. Navy, Contract No. N00014-01-C-0318, Feb. 2004.

Quackenbush T.R., et al., "Cost Effective on Demand Flow Control With Shape Memory Alloy Actuators," Final Report to NASA, Contract No. NAS102060, Jan. 2005.

Quackenbush T.R., et al., "Development and Test of an HTSMA Supersonic Inlet Ramp Actuator," Industrial and Commercial Applications of Smart Structures Technologies, Mar. 2008.

Quackenbush T.R., et al., "High Temperature Shape Memory Alloy Technology for Inlet Flow Control," C.D.I. Technical Rept. 11-12, NASA Contract No. NNX09CA29C, Jul. 2011.

Rutkovsky, V.B., "Supersonic Aircraft Engines," Thermal to Mechanical Energy Conversion: Engines and Requirements, vol. II Supersonic Aircraft Engines.

Van Humbeeck, J., "High Temperature Shape Memory Alloys," Trans. ASME, Journal of Eng. Material and Technology, vol. 121, pp. 98-110, Jan. 1999.

\* cited by examiner

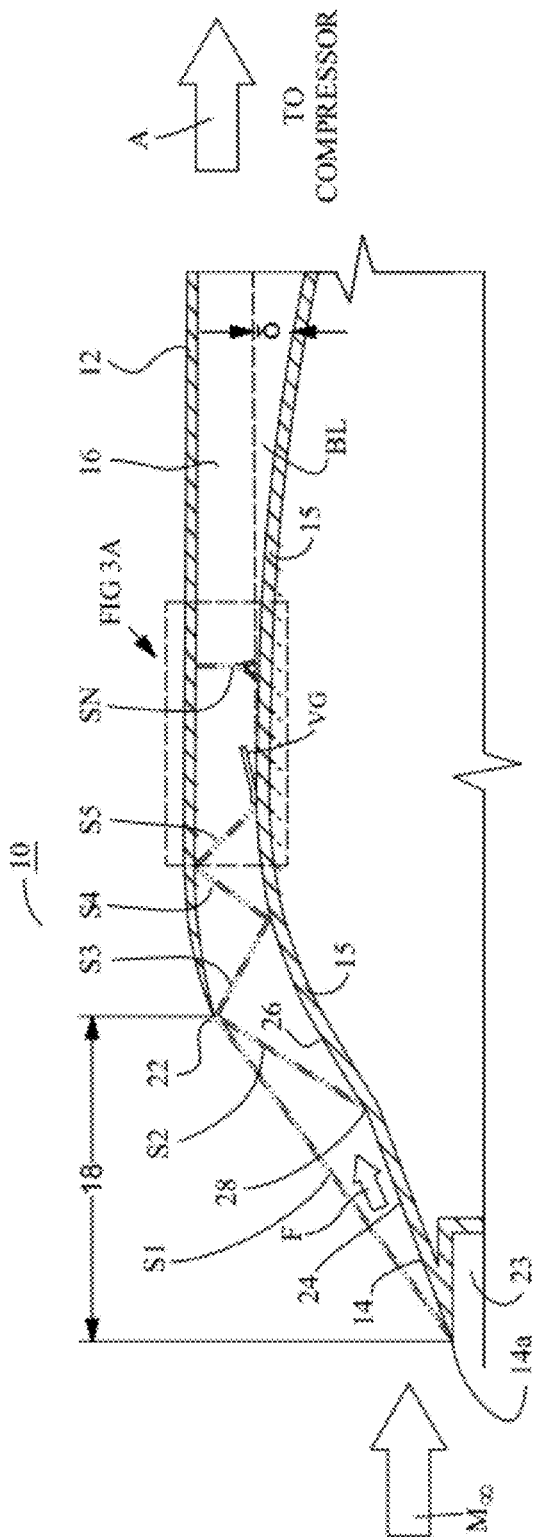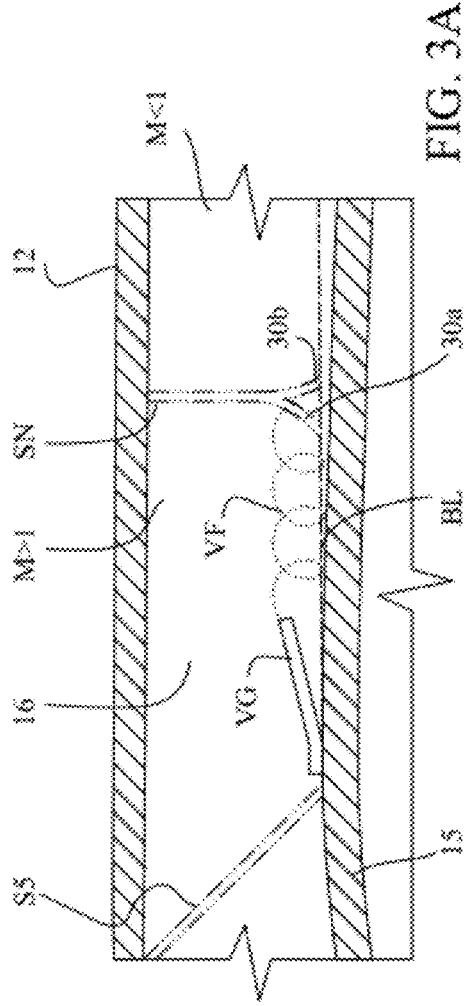

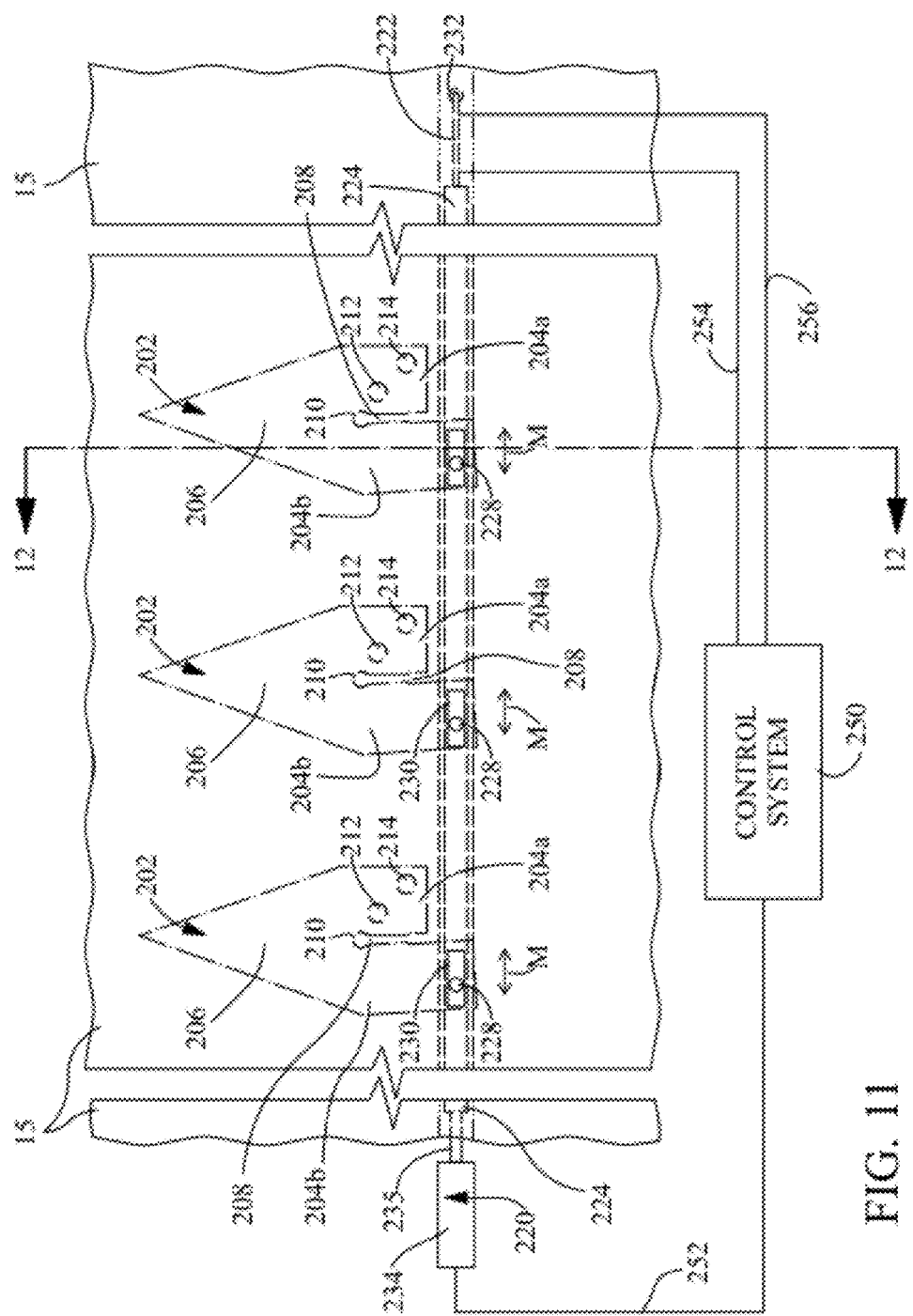
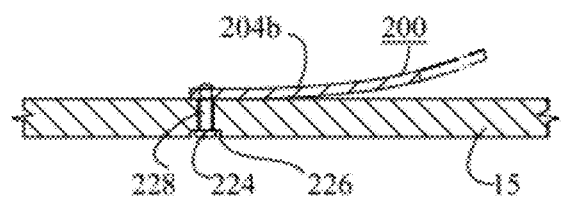
FIG. 11
FIG. 12

PRIOR ART
MICRO RAMP

DEPLOYED VG
(FIG. 10)

SUPERSONIC ENGINE INLET DIFFUSER WITH DEPLOYABLE VORTEX GENERATORS

CROSS-REFERENCE TO RELATED APPLICATIONS

This application claims the benefit of U.S. provisional application No. 61/457,865, filed Jun. 22, 2011, the contents of which are incorporated herein by reference.

STATEMENT REGARDING GOVERNMENT RIGHTS

This invention was made with Government support under contract number NNX09CA29C awarded by the National Aeronautics and Space Administration. The Government has certain rights in the invention.

BACKGROUND OF THE INVENTION

1. Field of the Invention

The present invention relates to an apparatus and method for enhancing flow mixing in the boundary layer in the inlet of a turbine engine for aircraft operating at supersonic velocities, and more particularly, to apparatus and methods for inhibiting flow separation from the wall of a supersonic engine inlet without undue penalties in engine performance.

2. Description of Related Art

Supersonic aircraft present numerous engineering challenges due to the shock waves they generate when operating at Mach numbers greater than one (M>1). A particularly difficult area to properly engineer is the aircraft turbine engine inlet diffuser. A large number of these challenges result from the necessity of slowing the supersonic flow entering the engine diffuser to a subsonic velocity (M<1) before it enters the aircraft engine compressor. It is axiomatic that slowing from supersonic to subsonic flow requires as a practical matter that the flow pass through one or more shock waves. This introduces irreversible total pressure losses, which can be mitigated to some extent by optimizing the shock structure in a supersonic inlet diffuser.

The large majority of supersonic engine inlets assume one of a number of basic configurations that have been settled for some time, and these configurations generate fairly well understood shock structures, as discussed in more detail further below. A standard inlet configuration seeks to minimize the inevitable pressure losses encountered in decelerating from supersonic to subsonic Mach numbers. The exact inlet dimensions and configuration must be determined for each new aircraft, and depend on numerous factors, such as the aircraft's overall mission profile, the airflow requirements of the engine at different points in the mission profile, and many others. This can present a complex design problem and sometimes requires that provision be made for altering the inlet configuration during aircraft operation. Nevertheless, the basic principles are well known and sophisticated design tools such as computational fluid dynamics are available to the engine and aircraft design engineer for optimizing inlet configurations for particular aircraft.

However, the presence of shock waves in the flow also causes other less well understood phenomena. One of these is the shock wave/boundary layer interaction (SBLI) within the diffuser's inlet duct. A boundary layer forms in a fluid moving relative to a wall due to viscous properties of the fluid, because the flow velocity is zero at the wall surface but accelerates to the free stream flow velocity at some point spaced from the wall. The distance from the wall to where the flow attains the free stream velocity is the boundary layer thickness, which generally tends to increase from one location to another traveling downstream in the fluid flow adjacent to a wall. The interaction of the boundary layer with the shock in a supersonic inlet diffuser has been the subject of many technical articles and patents. One such article is Herges, T., et al., "Micro-Ramp Flow Control on Normal Shock/Boundary Later Interactions," Amer. Inst. of Aeronautics and Astronautics Rept. No. AIAA 2009-920 (January 2009) ("Herges"). As Herges points out, in a typical supersonic inlet configuration the air flow decelerates through a series of shock structures usually terminating in a normal shock within an inlet duct. As a result, the growing boundary layer along the inlet duct wall experiences adverse pressure gradients, possibly resulting in boundary layer separation and unsteady pressure fluctuations in the pressure field downstream of the normal shock that adversely affect engine compressor performance and can even cause engine un-start. Herges notes that bleed systems, which extract low-momentum fluid from the boundary layer, have been demonstrated to reduce both boundary layer thickness and the severity of separation. However, bleeding fluid from the inlet flow results in a decrease of mass flow of air to the engine. Since a particular engine design must satisfy the thrust requirements necessary for the aircraft to operate throughout its mission profile, and engine thrust depends in significant part on the mass flow of air through the engine, a reduction in mass flow from bleeding the boundary layer usually requires a larger inlet to compensate for the reduction. This in turn causes more drag, adds weight (thus reducing aircraft payload), and lowers engine efficiency.

Herges discusses several flow-control methods that have been proposed in addition to boundary layer bleed systems to control SBLI. Early investigation into SBLI control focused on two-dimensional surface features that aimed to spread out the bifurcated lambda foot of the normal shock. A lambda shock decelerates the flow through a pair of oblique shocks, thus having a smaller total pressure loss than a single normal shock with the same static pressure rise. In addition, by spreading the lambda shock, the boundary layer will experience a smaller adverse pressure gradient and will be less likely to separate. This approach to SBLI control has been investigated by Herges and others using a variety of methodologies including porous surfaces and two-dimensional bumps. While two-dimensional surface features like bumps proved effectual at spreading the lambda foot of the normal shock, such large surface features increase drag.

Herges indicates that investigations into SBLI control using arrays of three-dimensional geometries for SBLI control suggested using sub-boundary layer vortex generators (SBVGs) for reducing boundary layer growth and eliminating or reducing separation when placed upstream of the shock wave/boundary layer interaction. In contrast with other approaches to SBLI control, SBVGs aim to control SBLI by energizing the boundary layer and making it less susceptible to shock-induced separation. SBVGs entrain higher momentum fluid to energize the low momentum fluid near the wall and improve boundary layer health and suppress or delay separation. Due to their smaller size, SBVGs have been shown to have significantly reduced device drag compared to conventional vortex generators.

One SBVG geometry that has been of particular interest is the micro-ramp. Herges states that micro-ramps can reduce separation region length and boundary layer thickness while being physically robust and easy to machine.

While micro-ramps did not completely eliminate boundary layer separation in all experiments, they have been shown to be effective in breaking up separation regions in the vicinity directly behind the micro-ramp. Therefore, micro-ramps optimally would be provided in an array in the engine inlet. Herges presents the results of experiments exploring possible geometries of micro-ramps and how to arrange them in arrays for optimal results.

There are still other technical articles reporting the results of investigations into the use of so-called micro-ramps or other configurations of SBVGs. One of these papers is Anderson, B., et al., "Optimal Control of Shock Wave Turbulent Boundary Layer Interactions Using Micro-Array Actuation," Amer. Inst. of Aeronautics and Astronautics Rept. No. AIAA 2006-3197 (June 2006) ("Anderson"). One of the objectives of Anderson's reported experiments was to establish the ability of micro-array flow control to manage the shock wave/turbulent boundary layer interactions in supersonic inlets and to evaluate the effectiveness of micro-array flow control relative to conventional inlet boundary layer bleed. Anderson notes that the purpose of the micro-arrays was to alter the properties of the supersonic boundary layer by introducing a cascade of counter-rotating micro-vortices in the near wall region surrounding the inlet surfaces. Anderson concludes that "the impact of the SWBL [shock wave boundary layer] interaction on the main flow field was minimized without boundary bleed."

Thus, the art has long recognized the efficacy of small, ramp-like, vortex-generating structures in minimizing the impact on supersonic engine inlet flow of shock wave boundary layer interaction, thereby eliminating the need for boundary layer bleed and its concomitant disadvantages. In addition to the Herges and Anderson articles, the patent literature includes numerous examples of different micro-ramp geometries and array configurations that act as vortex generators in a variety of environments. Some examples are shown in U.S. Pat. Nos. 3,578,264, 4,455,045, 4,175,640, 4,487,017, 4,696,442, 5,058,837, 5,598,990 and 8,087,250, and Pub. No. US 2010/0288379.

However, the fixed-geometry, permanently deployed vortex generators in the known prior art must inherently be designed for maximum relief of shock wave boundary layer interactions at a single point in the engine's operating envelope. Whatever design point is chosen (say, level-cruise at altitude), the presence of the vortex generators can actually degrade engine performance at other important engine operating points (such as climb under power). Any performance penalty is highly undesirable, and it is expected that adverse effects on engine efficiency will be particularly closely scrutinized in possible future commercial supersonic aircraft, since commercial aircraft operators generally consider efficiency penalties even in fractions of one percent to be unacceptable. In addition, a plurality of the prior art micro-ramps arrayed along a substantial portion of a wall of a supersonic engine inlet cause increased drag and concomitant pressure losses. These must be made up in some fashion if the engine is still to meet the performance requirements dictated by the aircraft mission. Typically, this involves increasing the inlet size to increase the mass flow of air through the engine to make up for the lost performance. In this respect, micro-ramps exhibit to an extent the undesirable side effects of using boundary layer bleed.

Further, it was noted above that the interaction of the boundary layer and the normal shock in the inlet also causes unsteady flow phenomena, and the dynamic behavior of the shock structures in the engine inlet can also have a significant adverse impact on the stability of the flow through the engine compressor. Flow instabilities due to SBLI can cause engine performance problems such as compressor stall and surge and a compressor blade aeroelastic effect known as "compressor buzz." While there has been extensive research aimed at further understanding, and overcoming, many adverse effects of non-steady-state flow in supersonic inlets, such research is ongoing and can be expected to continue to suggest new ways of mitigating such effects. A fixed configuration array of micro-ramps or other types of fixed-geometry vortex generators will be inherently limited in their ability to adapt to new inlet configurations that might be adopted for a given engine or aircraft after its initial design parameters are set. Fixed configuration, fixed geometry vortex generators are also unable to adapt to changes in the mission profile of a particular aircraft or to changes in engine design after the inlet has been fabricated with a fixed vortex generator configuration and geometry.

It would be advantageous if known micro-ramps or other vortex generators had a variable configuration, for example, by being retractable out of the air flow in the inlet during flight regimes when they are not needed and deployable when desired. In addition, not all flight regimes require the same amount of vorticity to be introduced into the flow in order to mitigate the effects of shock wave/boundary layer interaction. Accordingly, it would be likewise advantageous to be able to control the vortex generator geometry to account for different conditions associated with different flight regimes. Most of the prior art vortex generators are solid ramps, such as those used in the Herges and Anderson experiments discussed above, or other configurations that would be equally difficult to construct for deployment into and retraction from the flow, or for changing their geometry to control the characteristics of the generated vortices. And even if the advantages of providing deployable and retractable vortex generators had been recognized, mechanical linkages and complex mounting configurations might have been envisioned for prior art micro-ramps or other vortex generator structures. But it is not known that anyone before now even contemplated making prior art micro-ramps or other vortex generating structures for supersonic engine inlets retractable or capable of multiple positions to vary the properties of the vortices they generate.

There is at least one deployable vortex generator structure known in the prior art, as disclosed in U.S. Pat. No. 7,798,448, assigned to the assignee of the present invention. This patent discloses a flow-driven oscillating flap that attenuates noise generated by flow over a cavity. A deploying mechanism uses a shape-memory alloy (SMA) to provide a motive force to deploy the flap into the flow and retract it out of the flow. However, nothing in this patent suggests deployable/retractable vortex generators for supersonic engine inlets or providing for deployment through a range of positions to control the properties of the generated vortices. In fact, the assignee of the present invention is a pioneer in the use of shape-memory alloys to actuate flow control surfaces, as evidenced by others of its patents, such as U.S. Pat. Nos. 5,752,672, 6,220,550, and 6,497,385, but even so has not before now turned its attention to using shape memory alloy actuation to provide deployable, retractable, and controllable vortex generators for a supersonic aircraft engine inlet diffuser.

SUMMARY OF THE INVENTION

It is an object of the present invention to provide at least one flow control surface that can be mounted in a supersonic flow, such as in the inlet diffuser of a gas turbine engine for a supersonic aircraft, for selective actuation between a deployed position in which the flow control surface extends from an inlet duct wall into the flow to mitigate adverse effects of interactions between the boundary layer along the wall and a normal shock downstream of the flow control surface, and a retracted position in which the flow control surface is essentially flush with the inlet duct wall.

Devices that provide such flow control surfaces are sometimes referred to "vortex generators" in the descriptions of various embodiments that follow further below. This terminology is not meant to be limiting in any way, and merely reflects the current understanding of those skilled in the art that prior art devices function by mixing higher energy freestream flow with lower energy flow in the boundary layer, making the boundary layer more stable and thereby mitigating adverse SBLI effects. The understanding of those skilled in the art is that this occurs as a result of counter rotating vortices shed by the devices, and it is believed that devices in accordance with the invention function in the same way, as shown notionally in various figures herein. However, the disclosed flow control devices and methods may or may not work through the mechanism of inducing vorticity in the flow in accordance with the current understanding of the art. The invention is not limited to that or any other theory of operation, and is defined solely by the subject matter as recited in the claims appended hereto. In addition, the term "flush," "essentially flush," or "substantially flush" is intended to refer to a position in which the flow control surface lies as flat as possible along the duct wall consistent with its construction, attachment to the duct wall, and mode and mechanism of actuation. In other words, the surface's "retracted position," in which it is "substantially flush" with the wall, is a position in which the surface produces minimum disturbance to the behavior of the boundary layer flow given the presence of the device.

In accordance with a first aspect of the invention, the flow control device comprises a deformable flap that can occupy only two stable positions, one in which the surface is deployed and the other in which it is retracted. In one embodiment an actuating mechanism uses a shape-memory alloy comprising a pair of wires that are selectively actuated to move the flap to either of its stable positions from the other stable position.

In accordance with another aspect of the invention, the flow control device comprises a deformable flap that can be controlled to selectively assume a retracted position or a deployed position in which it extends into the flow along the duct wall to a height that is controlled by an actuating mechanism. The actuating mechanism holds the flap at the desired height, and in one embodiment comprises a shape-memory alloy actuating member.

In accordance with still another aspect of the invention, an array of multiple devices is disposed in the inlet duct, and selected devices in the array can be actuated individually or in groups. Such an array can comprise one or more devices in accordance with either or both of the two-position aspect or controllable-position aspect of the invention.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The objects of the invention will be better understood from the detailed description of its preferred embodiments which follows below, when taken in conjunction with the accompanying drawings, in which like numerals and letters refer to like features throughout. The following is a brief identification of the drawing figures used in the accompanying detailed description.

FIG. 3 is a cross-sectional depiction of the planar diffuser shown in FIG. 1, taken in a longitudinal plane in the flow direction, showing the general orientation of deployable vortex generators in accordance with an embodiment of the present invention. FIG. 3 illustrates a typical shock system with multiple oblique shocks externally and internally of the diffuser inlet duct that introduces airflow to the engine compressor and a normal shock within the inlet duct. FIG. 3A is a detailed view of a portion of the inlet diffuser showing the location in relation to the normal shock of a flow control device in accordance with an embodiment of the invention (the flow control device is not shown to the same scale as the diffuser).

FIG. 11 is a top view of the vortex generator array in FIGS. 9 and 10.

FIG. 12 is a cross-sectional depiction taken along lines 12-12 in FIG. 11.

FIG. 16, comprising

Those skilled in the art will readily understand that the drawings are not strictly to scale and that in some instances are highly schematic, but nevertheless will find them sufficient, when taken with the detailed descriptions of preferred embodiments that follow, to make and use the present invention.

DETAILED DESCRIPTION OF EXEMPLARY EMBODIMENTS

The detailed description that follows is intended to provide specific examples of particular embodiments illustrating various ways of implementing the claimed subject matter. It is written to take into account the level of knowledge of one of ordinary skill in the art to which the claimed subject matter pertains. Accordingly, certain details may be omitted as being unnecessary for enabling such a person to realize the embodiments described herein. It will also be understood that terms indicating direction or orientation, such as "lower," "upper," "top," etc., may be used to facilitate the description of these exemplary embodiments. The use of such terms does not imply that the claimed subject matter is limited to a particular orientation of the structure being described.

General Applicability of the Invention

Figure 1:
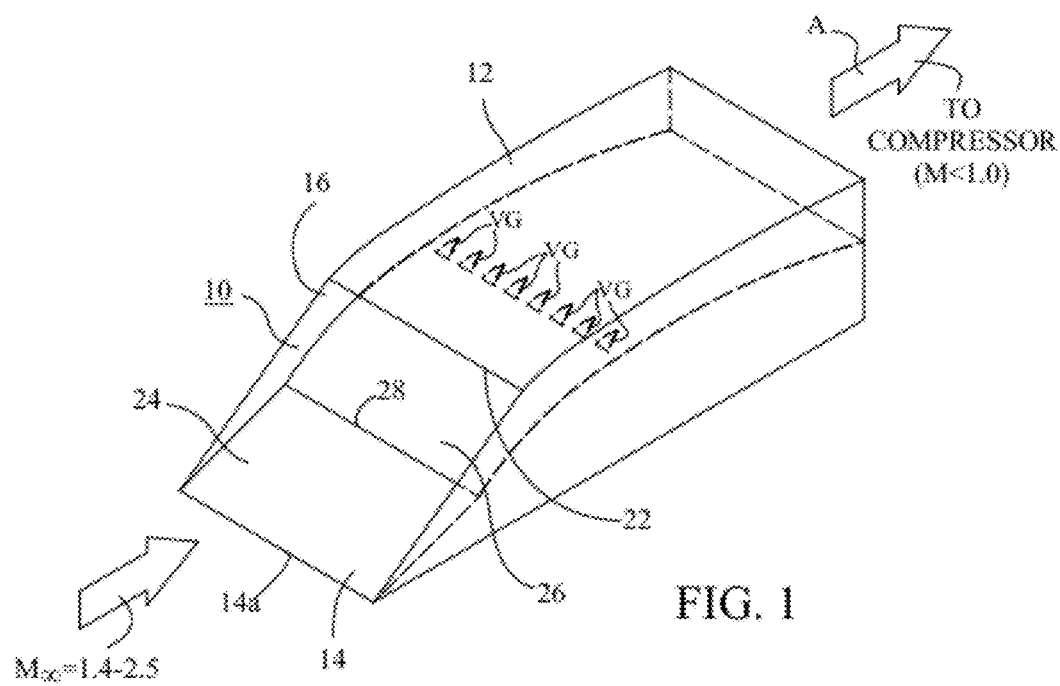
FIGS. 1 and 2 are schematic perspective views depicting two basic configurations of supersonic turbine engine inlets with which the present invention can be used, with FIG. 1 showing a planar diffuser with external compression and FIG. 2 showing an axially symmetric diffuser with external compression.

The present invention is most advantageously applied to the inlet diffuser of a turbine engine for an aircraft capable of operating at M>1. FIG. 1 is a highly schematic perspective illustration of a planar diffuser 10 for such an engine. The diffuser 10 is described in further detail below in connection with FIGS. 3 and 3A, but suffice it to say at this point that the diffuser will typically be attached to the aircraft at a suitable location, typically under the fuselage, under a wing, or at a wing root (none of which are shown in the drawings). A nacelle 12 forms an outer wall of the diffuser and a shaped ramp 14 extends the length of the diffuser from a sharp edge 14a into the nacelle 12 to form an inlet duct 16. The duct accepts air flow travelling relative to the aircraft at a freestream supersonic Mach number $M_\infty$ greater than one, typically in the range of about 1.4 to 2.5 for a diffuser with the configuration shown in FIG. 1, and air flows from the inlet duct 16 at a subsonic velocity (M<1) into the engine compressor (not shown) as indicated by an arrow A. The exact configuration and dimensions of the nacelle and the ramp will vary from application to application, and in accordance with the operating requirements of the aircraft turbine engine with which the diffuser is used. For example, the velocity of the air to be provided to the compressor will vary from application to application, and the geometry of the diffuser will be designed to deliver the air flow to the compressor in accordance with its design requirements. In addition, various parts of the diffuser can be made to assume different geometries at different flight conditions, such as by providing means for changing the angles presented to the flow by various section of the ramp 14. Vortex generators VG according to the present invention are installed in the inlet duct as shown in FIG. 1, it being understood that the depiction of the vortex generators VG in FIG. 1 is notional and serves simply to indicate the approximate location in the duct 16 where an array of vortex generators might be located. It will also be appreciated that the vortex generators VG in FIG. 1 are not to scale and would normally be much smaller than depicted in the figure in relation to a typical diffuser.

Figure 2:
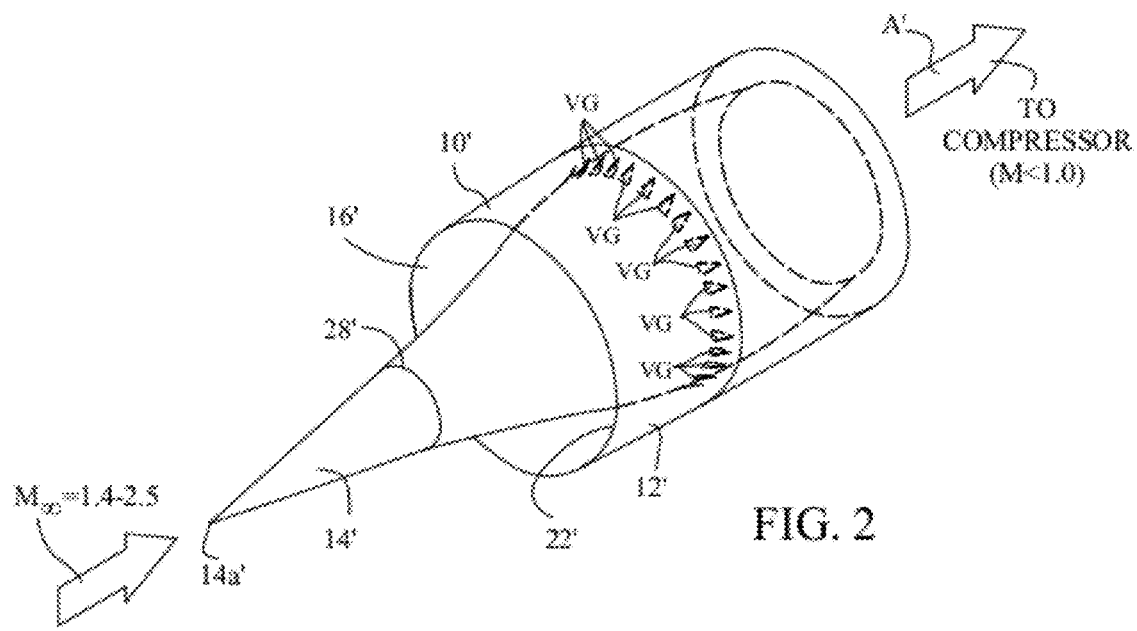

FIG. 2 is a perspective illustration of an axisymmetric diffuser 10' that functions in a fashion similar to the planar diffuser 10 shown in FIG. 1. Parts of the axisymmetric diffuser in FIG. 2 that generally correspond to parts of the planar diffuser 10 are denoted with a prime ('). The axisymmetric diffuser 10' includes a cylindrical nacelle 12' with a central spike 14' disposed concentrically with the nacelle 12'. The upstream end of the spike 14' terminates in a sharp point 14a' that meets the incoming freestream flow travelling at $M_\infty$ greater than one as with the axisymmetric planar diffuser 10 shown in FIG. 1. The annular space between the nacelle and the spike 14' forms an inlet duct 16', which, like the inlet duct 16 in the diffuser 10, provides air to the engine compressor at M<1, indicated by arrow A'. The vortex generators VG of the present invention are shown notionally as in FIG. 1 in a typical location within the duct 16'. As those skilled in this art understand, this type of inlet diffuser can also be made with a variable geometry by, for example, providing means for moving the spike 14' axially for different flight conditions.

FIG. 3 shows a cross-section of the planar inlet diffuser 10 shown in FIG. 1, taken in a plane along the flow direction and perpendicular to the walls of the inlet duct 16. As already noted, the diffuser 10 includes an external nacelle 12 and a shaped ramp 14, which together form an inlet duct 16 that accepts air at a freestream velocity $M_\infty$ greater than one from upstream of the diffuser. The shock system shown in FIGS. 3 and 3A, and described in more detail below, is typical of such inlet diffusers operating at a freestream Mach number $M_\infty$ of about 1.4 to 2.5. At its downstream end the duct 16 delivers the air to the engine compressor (not shown).

Salient characteristics of the diffuser 10 include an external diffuser portion 18 extending axially between the sharp leading edge 14a of the ramp 14 to a sharp leading edge 22 of the nacelle 12. (These features find counterparts in the sharp upstream point 14a' and sharp leading edge 22' of the nacelle 12' in FIG. 2.) Supersonic inlet diffusers of this type typically have a space 23 between the leading edge 14a and the adjacent aircraft structure, such as the fuselage, a wing, etc. on which the diffuser is mounted (shown schematically in FIG. 3), which prevents ingestion into the diffuser of the boundary layer on the adjacent aircraft structure. The external portion 18 of the ramp 14 includes a first ramp portion 24 and a second ramp portion 26 that presents a greater angle to the flow than the first portion 24. These two ramp portions 24 and 26 meet at a sharp inside corner 28 (see corner 28' in FIG. 2). The ramp 14 transitions to a curved inner duct wall 15. In accordance with known principles of fluid mechanics, a conical shock front S1 that is oblique to the incoming flow attaches to the point 14a, which is made as sharp as possible (that is, with the smallest possible radius of curvature consistent with accepted manufacturing practice). Another oblique shock front S2 attaches to the corner 28, which is also made as sharp as possible consistent with accepted manufacturing practice. Principles of fluid mechanics require the point 14a and the corner 28 to be as sharp as possible in order to cause stable shock fronts to form at these precise locations with a minimum of unsteady fluctuations in the properties of the shock fronts. The dimensions and configuration of the various inlet parts are judiciously chosen, again in accordance with known jet engine design practices, so the oblique shock fronts S1 and S2 extend at an angle that causes the shock fronts to extend to the leading edge 22 of the nacelle 12. This leading edge is also made as sharp as possible to stabilize the positions of the shock fronts.

Since the shock fronts S1 and S2 are oblique to the direction of the flow, as indicated by the arrow F, the flow velocity downstream of each shock front remains supersonic (M>1). These oblique shock fronts are so-called "weak shocks," since they do not decelerate the flow to a subsonic velocity. The inlet diffuser 10 is designed also to create multiple oblique shock fronts S3, S4 and S5 within the duct 16 proximate to the leading edge 22 of the nacelle. These are called "swallowed" shocks because they are within the inlet duct 16. The first swallowed shock S3 attaches to the sharp leading edge of the nacelle 12. The second swallowed oblique shock S4 forms with an inner end at the location on the surface of the duct wall 15 where the shock front S3 terminates. It forms an angle with the surface of the ramp that is the same as the angle formed by the second swallowed shock front S3, and for that reason is sometimes called a "reflected shock." Under the particular flow conditions depicted in FIG. 3, another reflected shock S5 forms downstream of the shock front S4. Generally speaking, having a greater number of weak shocks (where the flow is supersonic both upstream and downstream of the shock front) minimizes the total pressure loss through the inlet and thus increases engine efficiency.

Eventually, the flow must decelerate to a subsonic velocity (M<1) before it is introduced to the engine compressor at the outlet of the duct 16. This deceleration occurs at a so-called normal shock SN downstream of the last oblique shock front S5. Because the flow decelerates nearly instantaneously across this shock wave, it is a often referred to as a "strong shock," and this instantaneous change in pressure can cause significant instability in the boundary layer at the surface of the ramp 14 as the air flows across the normal shock SN. FIG. 3A, which is an enlarged view of the duct 16 in the vicinity of the normal shock, illustrates to some extent the complexity of the flow in the boundary layer region. As indicated in the figure, the normal shock SN does not simply form a single shock front that intersects the duct walls. The physics of the flow induce two oblique shocks 30a and 30b in the near-wall region of the flow that are sometimes referred to as "lambda shocks" or the "lambda foot" of the normal shock (after its resemblance to the Greek letter "λ"). There have been attempts to lessen the adverse effects of the interaction of the boundary layer with the normal duct shock by using movable flaps in the duct wall at the lambda foot of the normal shock. See, for example, Patent Pub. No. 2002/0190164. It should be mentioned here that the depiction here of the relative locations of the inlet duct minimum cross-section, the normal shock, and the vortex generators is highly schematic. The normal shock will form at different locations in the duct under different engine operating conditions and the location of the vortex generators will typically be determined empirically in an actual installation.

As explained above, a boundary layer begins to form in the near-wall region of any fluid flow in a duct, because any actual fluid, including air, has a certain viscosity. The boundary layer on the wall of the ramp 14 begins to form at the leading edge 14a where the flow first encounters the ramp, and grows downstream from there. However, in the region 18 external to the duct 16 and for a certain distance within the duct itself, the pressure gradients experienced by the flow in the downstream direction tend to minimize the thickness of the boundary layer. However, after the last oblique shock front S5, the flow velocity has slowed appreciably (although it remains supersonic at this point). The boundary layer BL begins to thicken at this point and, as depicted schematically in FIGS. 3 and 3A, downstream of the normal shock SN its thickness δ has grown substantially. Because of the need to decelerate the flow before it reaches the compressor, the pressure gradients downstream of the normal shock SN are unfavorable for maintaining attachment of the flow to the duct wall. As a result the flow may separate from the wall altogether, a condition that cannot be tolerated because of the severely adverse effects it would have on compressor performance and thus on overall engine performance. And even if the flow does not separate, interaction of the thickening boundary layer with the normal shock can produce unstable fluctuations in the normal shock position, which can affect flow conditions downstream at the entrance to the compressor, potentially causing undesirable flow instabilities in the compressor.

To forestall these adverse effects and to minimize the possibility of flow separation vortex generators VG are disposed on the wall of the duct 16 to introduce vortical flow VF into the boundary layer BL. As already noted, prior art vortex generators can assume a variety of shapes and configurations and are typically arranged in an array covering a substantial portion of duct wall. See Herges and Anderson, for example. One form of vortex generator known to be effective in preventing flow separation is the micro-ramp discussed by Herges and others. However, as noted above, these prior art micro-ramps are permanently deployed and their flow characteristics cannot be changed once they are in place. The present invention uses the vortex generators VG shown more or less schematically in FIGS. 1 to 3, particular embodiments of which are described in more detail below.

Before various embodiments of the present invention are described, however, it should be made clear that the invention is not limited to use with the external compression type of inlet diffuser described and depicted above in FIGS. 1 to 3. For example, another basic supersonic inlet diffuser configuration employs only internal compression, in which all of the shock fronts are within an inlet duct. However, this type of supersonic diffuser also has a normal shock in the flow before the flow reaches the engine compressor, and the present invention is easily adapted to such inlets in accordance with the description herein.

Two-Position Vortex Generator

Figure 4:
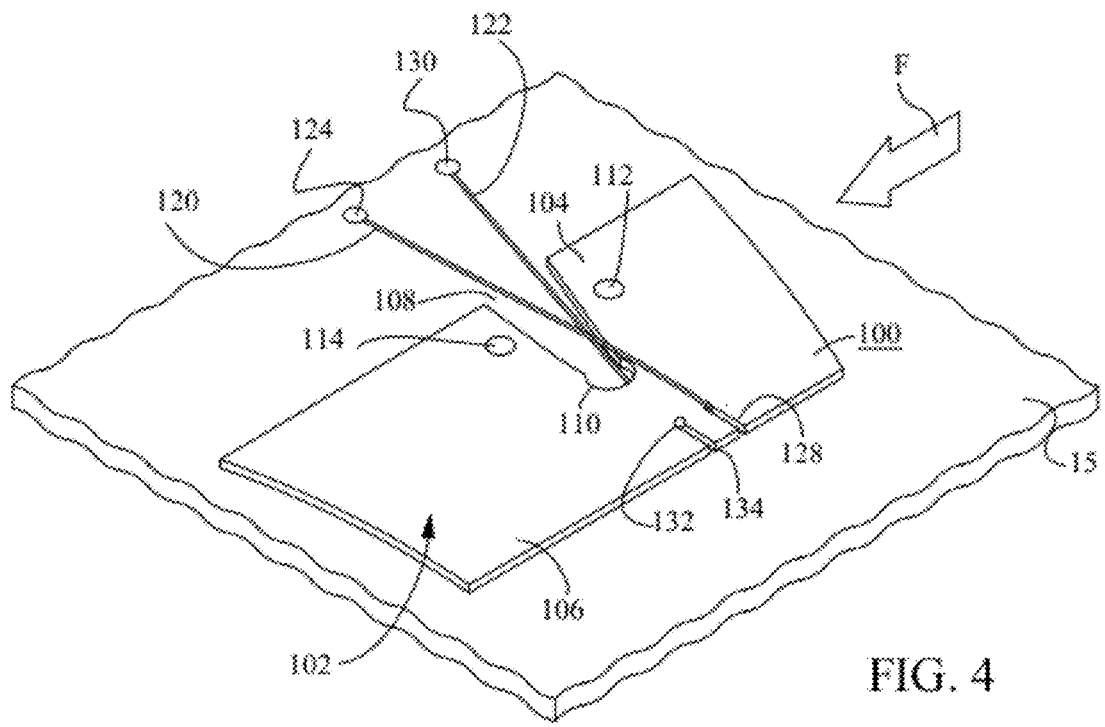
FIG. 4 is a perspective view of a two-position vortex generator in accordance with a first embodiment of the invention in its retracted position.
Figure 5:
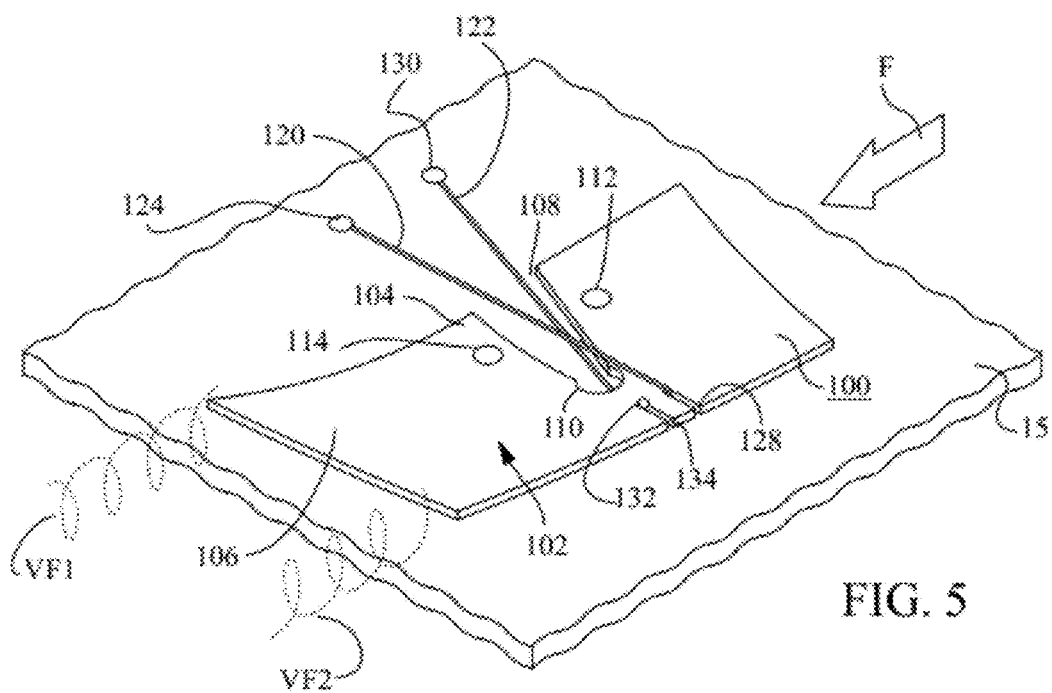
FIG. 5 is a perspective view of the vortex generator in FIG. 4 in its deployed position.

FIGS. 4 to 8 depict an embodiment of a two-position vortex generator 100 that has been tested under conditions described further below. FIG. 4 illustrates the two-position vortex generator in its retracted position and FIG. 5 illustrates it in its deployed position. The vortex generator is attached to the inlet duct inner wall 15 and the flow direction is indicated by the arrow F. In the deployed position the vortex generator 100 sheds counter rotating vortices VF1 and VF2 depicted notionally in FIG. 5. When the vortex generator 100 is in the retracted position shown in FIG. 4, it is substantially flush with the duct wall (see FIG. 7) and produces minimal drag and vorticity.

Figure 6:
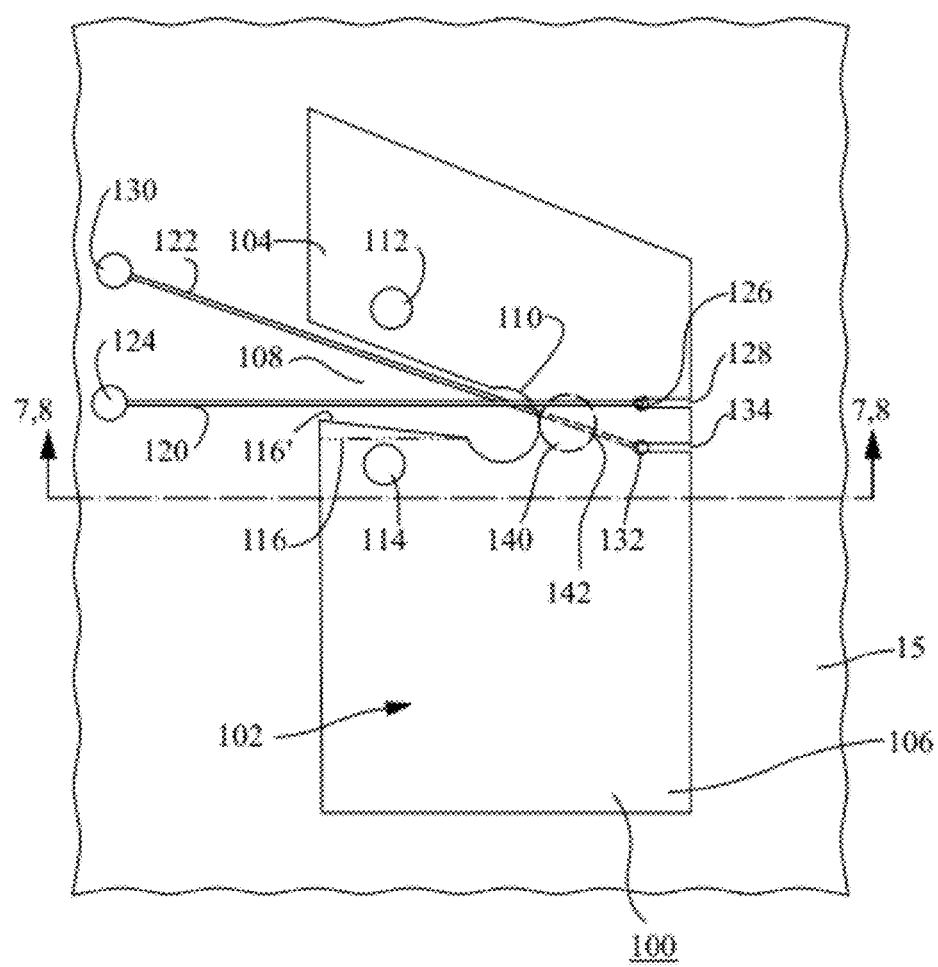
FIG. 6 is a top view of the vortex generator shown in FIGS. 4 and 5.
Figure 7:
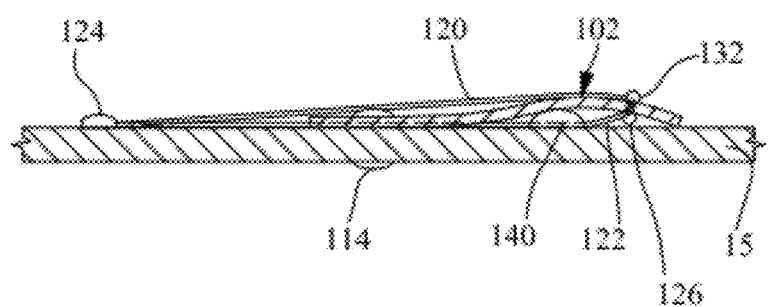
FIG. 7 is a cross-sectional depiction taken along lines 7,8-7,8 in FIG. 6, showing the two-position vortex generator in its retracted position.
Figure 8:
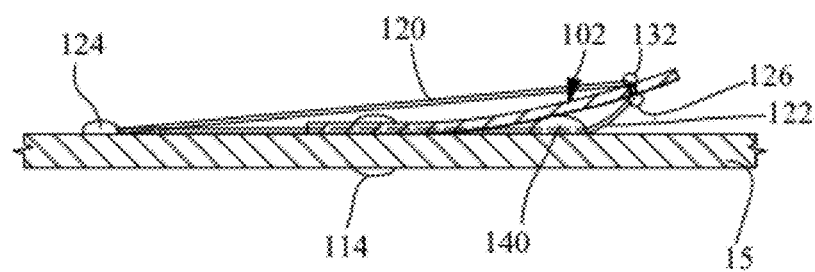
FIG. 8 is a cross-sectional depiction taken along lines 7,8-7,8 in FIG. 6, showing the two-position vortex generator in its deployed position

FIG. 6 is a top plan view of the vortex generator 100, from which its constructional features can be understood when taken in connection with FIGS. 4, 5, 7, and 8. The vortex generator 100 comprises a flap 102 of an elastically deformable material, which can be stainless steel, aluminum, a composite, or any other material that maintains its properties over an extended length of time (preferably hundreds of hours) at temperatures that may be encountered in a supersonic aircraft engine inlet diffuser (which can reach up to 200° F. or more). The flap 102 comprises a first portion 104 that is securely attached to the duct wall 15 and a second, active portion 106 that is movable between the retracted position (FIGS. 4 and 7) and the deployed position (FIGS. 5 and 8). As best seen in the plan view of FIG. 6, the first portion 104 includes a keyhole-shaped cutout 108 with a width that converges from the edge of the flap 102 to a terminus 110 so that the cutout 108 is about one-half the width of the flap 102. The terminus 110 is generally circular, having a radius slightly larger than the width of the cutout 108 where it joins the circle portion that forms the terminus 110. This enlarged portion 110 at the inside end of the cutout prevents stress concentration at the inside end of the cutout 108 that would otherwise be present if the cutout ended in a sharp inside corner.

The first portion 104 of the flap 102 is secured to the duct wall 15 by fasteners 112 and 114. The fasteners 112 and 114 can take any suitable form that securely attaches the flap 102 to the duct wall 15. Examples of fasteners that would be suitable for the purpose in an operable turbine engine inlet diffuser would be rivets (suggested in the figures here), any one of a variety of types of specialty aerospace fasteners known to those skilled in the art, and adhesives (especially when the flaps 102 comprise a composite material). A salient feature of the present embodiment is that the flap 102 has a planform represented by the dot-dash line 116 before it is attached to the duct wall. Then, when attaching the flap 102 to the duct wall, it is deformed generally in the plane of the flap and secured to the duct wall 15 with the edge 116 in the position indicated at 116'. It will be appreciated that when the edge 116 of the cutout 108 is deformed in this manner, the flap buckles and creates an actuatable, active portion 106 that can be moved between the retracted and deployed positions in a manner to be discussed shortly.

The vortex generator 100 further includes an actuating mechanism that in the present embodiment comprises an upper shape-memory alloy wire 120 and a lower shape-memory alloy wire 122, which taken together can be considered a shape-memory alloy actuating member. (The properties of shape-memory alloys that lend themselves particularly to use in the present invention are discussed in more detail below.) Taking the upper wire 120 first, it is securely attached at a first end to the duct wall 15 by a suitable fastener 124. The drawing omits details of the fastener 124 since it will be well within the skill of those in the art to devise any suitable fastening that secures the wire 120 to the duct wall to provide the functionality described herein. For example, the fastener could be a blind screw threaded into the duct wall, one of a variety of known aerospace fasteners, a rivet, or the like. The other end of the upper wire 120 terminates in a small bead 126 formed by welding onto the wire a ball larger than the wire diameter. The bead 126 is captured in a first slot 128 that has a width just slightly larger than the diameter of the upper wire 120 but smaller than the bead 126. In this fashion, the bead 126 is held in the first slot 128. One end of the lower wire 122 is secured to the duct wall 15 by a suitable fastener 130 that meets the criteria set out above regarding the upper wire fastener 124. While the fasteners 124 and 130 will typically be the same in most embodiments of the vortex generator 100, particular applications may require that they be different. And in like fashion to the upper wire 120, the other end of the wire 122 also terminates in a small bead 132. The bead 132 is captured in a second slot 134 that has a width just slightly larger than the diameter of the lower wire 122 but smaller than the bead 132. In this fashion, the bead 132 is held in the second slot 134.

As noted, the wires 120 and 122 are made from a material commonly known as a "shape-memory alloy." The properties of such alloys are familiar to those skilled in the art and are discussed in detail in prior patents mentioned above and assigned to the assignee of the present invention, such as U.S. Pat. Nos. 5,752,672 and 6,220,550, both of which are incorporated by reference as if set forth in full herein. These materials are characterized by having one of two stable, reversible crystalline phases: a high temperature "austenite" phase and a low temperature "martensite" phase. Transition between the austenite and martensite phases is typically accomplished through temperature change, which changes the material's elastic modulus. An SMA material can thus cause a displacement that can be used for actuation. For example, when heated an SMA wire under tension will exert a contraction force, and then relax if the temperature is reduced. Typically, the wire will be heated using ohmic resistance heating generated by passing a current through it, although it is possible in some applications to use heat from the environment in which the SMA is used, or to use an external heater.

The vortex generator 100 has two stable positions as a consequence of the in-plane elastic deformation caused by narrowing the cutout 108 when the flap is attached to the duct wall. The upper wire 120 and lower wire 122 are both elongated regardless of the position of the flap's movable active portion 106. In the retracted position (FIG. 7), the lower wire 122 has been heated to cause a downward force to be exerted on the flap by virtue of the capture of the bead 132 in the slot 134. This in turn further stretches the upper wire 120. To deploy the active portion 106, the upper wire 120 is heated, whereby it exerts an upward force on the flap by virtue of the capture of the bead 126 in the slot 128. When the flap moves to its deployed position (FIG. 8), the lower wire 122 is stretched and can thereafter be heated to return the active portion 106 to its retracted position. By way of explanation, FIG. 6 is meant to depict the vortex generator 100 planform in general, and not necessarily in either the deployed or retracted position. By the same token, FIGS. 7 and 8 are sections of FIG. 6 with the flap in the retracted and deployed positions, respectively.

Assuming that the flap 102 begins in its retracted position shown in FIG. 7, the upper wire 120 and lower wire 122 are both elongated from their original, undeformed lengths. The lower wire has been heated by passing a current through it, which causes it to contract and pull the active portion 106 down. This bends the flap over a small protuberance 140 suitably secured to the duct wall 15, as best seen in FIG. 7. The protuberance can be made from a metal or plastic that is of sufficient hardness to resist deformation by the flap at the temperatures experienced in a supersonic inlet diffuser. The flap, which is slightly buckled because of its in-plane elastic deformation when it is secured to the duct wall, snaps elastically into the retracted position in which it bends over the protuberance 140 as shown in FIG. 7. The protuberance 140 has a small groove 142 through which the lower wire 122 passes to ensure that the flap is bent over the protuberance when the flap is in its retracted position. To place the flap in its deployed position (FIG. 8), the upper wire 120 is heated by passing a current through it. Because the flap is bent over the protuberance 140, the contracting upper wire 122 exerts a bending moment on the flap and causes the active portion 106 to snap into in its deployed position. Thus, the active portion 106 of the flap is confined in an elastically deformed condition for movement between one stable position in which the active portion is elastically deformed for holding the active portion in one of the retracted position and the deployed position and another different stable position in which the active portion is elastically deformed for holding the active portion in the other of the retracted position and the deployed position. In the same connection the actuating mechanism includes at least two shape-memory alloy actuating wires attached to each of two opposing sides of the active portion, one actuating wire being elongated when the active member is one of its stable positions so that heating the one wire contracts it and moves the active portion to its other stable position and elongates the other said actuating wire.

It will be understood that the vortex generator 100 is typically but one of an array disposed in the inlet duct 16 as shown notionally in FIG. 1 (or FIG. 2). Such an array can assume various forms. As discussed in more detail further below, such an array can comprise a plurality of vortex generators arrayed in plural rows, arranged one behind the other in the direction of the flow through the inlet duct 16. The size or sizes of the flaps in any given application will likely be determined empirically by testing a variety of sizes and shapes for maximum effect. Nor do all of the flaps necessarily have to be of the same size or shape. Likewise, those skilled in the art will recognize that in such an array in a supersonic inlet diffuser electrical wires for passing the desired currents through the SMA wires 120 and 122 can be implemented in a variety of ways. For example, leads (not shown) to the wires 120 and 122 can be disposed under the duct wall 15 (that is, out of the flow) and connected to the wires through the fasteners 124 and 130. A single ground wire (not shown) could be disposed under the duct wall and connected to all of the flaps in the array through one of the fasteners 112 or 114. By selectively connecting the SMA wires for each flap to a current source, presumably under the control of a computer, various combinations of flaps in an array can be deployed and retracted under different flow conditions.

The efficacy of this embodiment was demonstrated by testing a vortex generator having the configuration shown in FIGS. 4 to 8 tested in a wind tunnel with a test section six inches in diameter. The flaps were of the same trapezoidal shape seen in FIG. 6, each being 1" wide (transverse to the flow direction), 1.4" on the short side where they were attached to the wind tunnel test section, and 1.7" on the opposite long side. The flaps were made of stainless steel with a thickness of 0.005". The shape-memory alloy wires were made of a 50/50 alloy of nickel and titanium (NiTi) having a diameter of 0.010", and the flap was deployed and retracted by applying a current of two amperes to the respective actuating wires. The test was performed at a nominal sea level Mach number of 0.68, but at a dynamic pressure equivalent to M=1.4 at a 50,000 ft. altitude. This test demonstrated that a two-position device according to the present embodiment would be operational (that is, they would remain deployed until retracted, and vice versa) under flow conditions simulating those in an inlet diffuser for a possible future supersonic business jet.

In another test, 28 identical two-position vortex generators with the dimensions discussed above were positioned in an array along a wing section and subjected to flow at M=0.2. When deployed, each device extended about 0.30" into the flow, which approximated the boundary layer thickness at the position of the devices, and when retracted presented a profile of only 0.06" to the flow (less than the boundary layer thickness). Tuft flow visualization and measurements of the lift generated by the wing section with the flaps both deployed and retracted, and in an identical wing section without the array of vortex generators, demonstrated that the deployed vortex generators promoted boundary layer attachment and inhibited stalling of the wing. This test suggests that two-position vortex generators according to the invention can produce significant vortical flows as depicted in FIG. 5, and that they would accordingly attenuate SBLI effects in a supersonic inlet diffuser if appropriately sized to extend into the flow to a height approximating the prior art fixed geometry micro-ramps discussed above. This conclusion is reinforced by the successful testing of the controllable-position vortex generator embodiment of the invention discussed in the next section.

As noted already, the present embodiment enables many variations in the configuration of each flap and the manner in which the flaps are arrayed and actuated. For example, the location of the slot 128 along the edge of the flap 102 can be chosen to cause the active portion 106 to extend a desired height into the flow. That is, by changing the configuration so that the slot 128 is closer to the downstream end of the flap will cause it to extend a lesser distance into the flow. In that case, the slot 134 would preferably be re-located a concomitant distance. Those skilled in the art will be able to construct many different shapes of flaps that are capable of operation in accordance with the above discussion of the present embodiment, and the invention is not limited to any particular shape of flap.

Controllable-Position Vortex Generator

Figure 9:
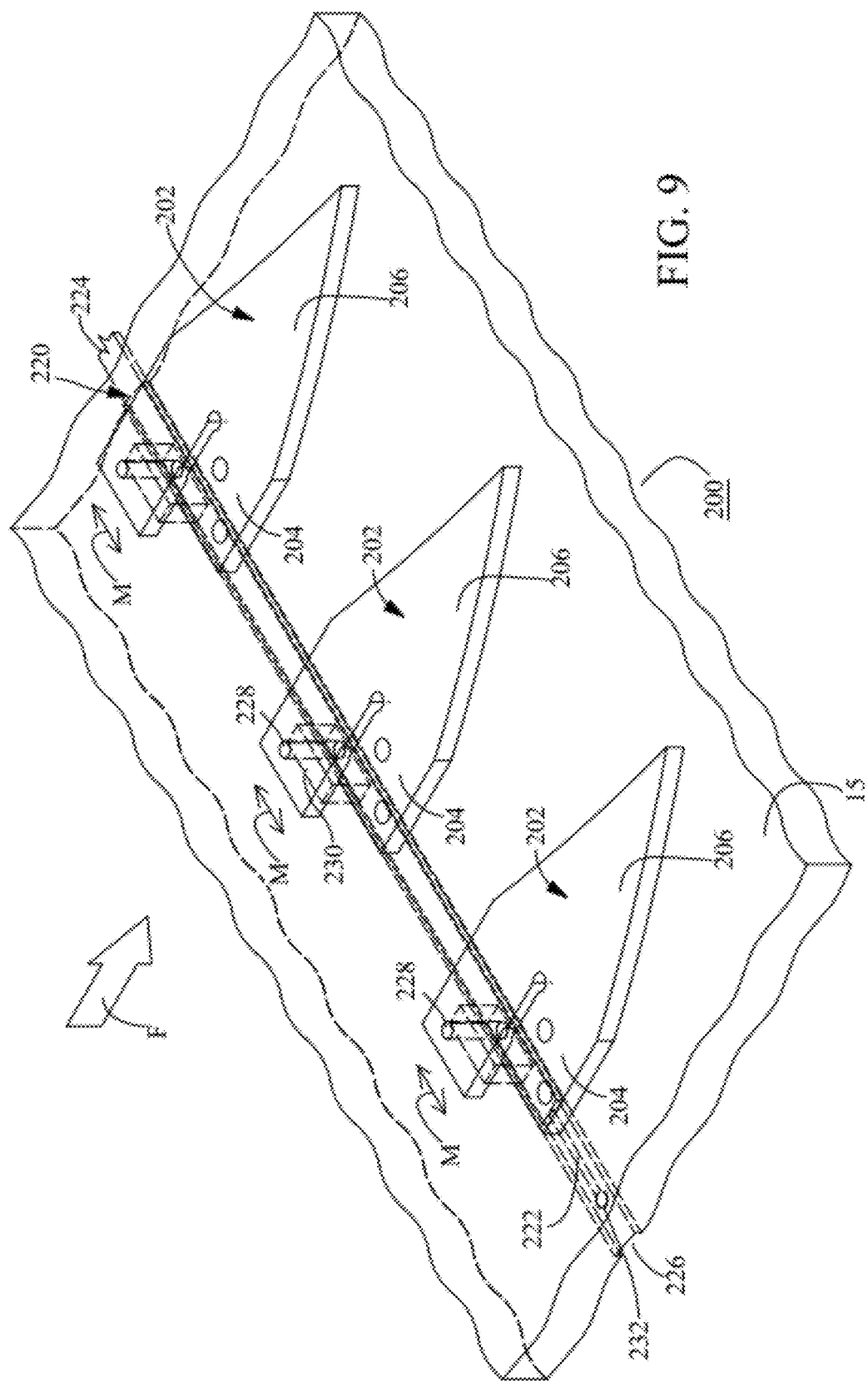
FIG. 9 is a perspective view of a truncated array of controllable-position vortex generators in accordance with another embodiment of the invention, showing the vortex generators in the retracted position.
Figure 10:
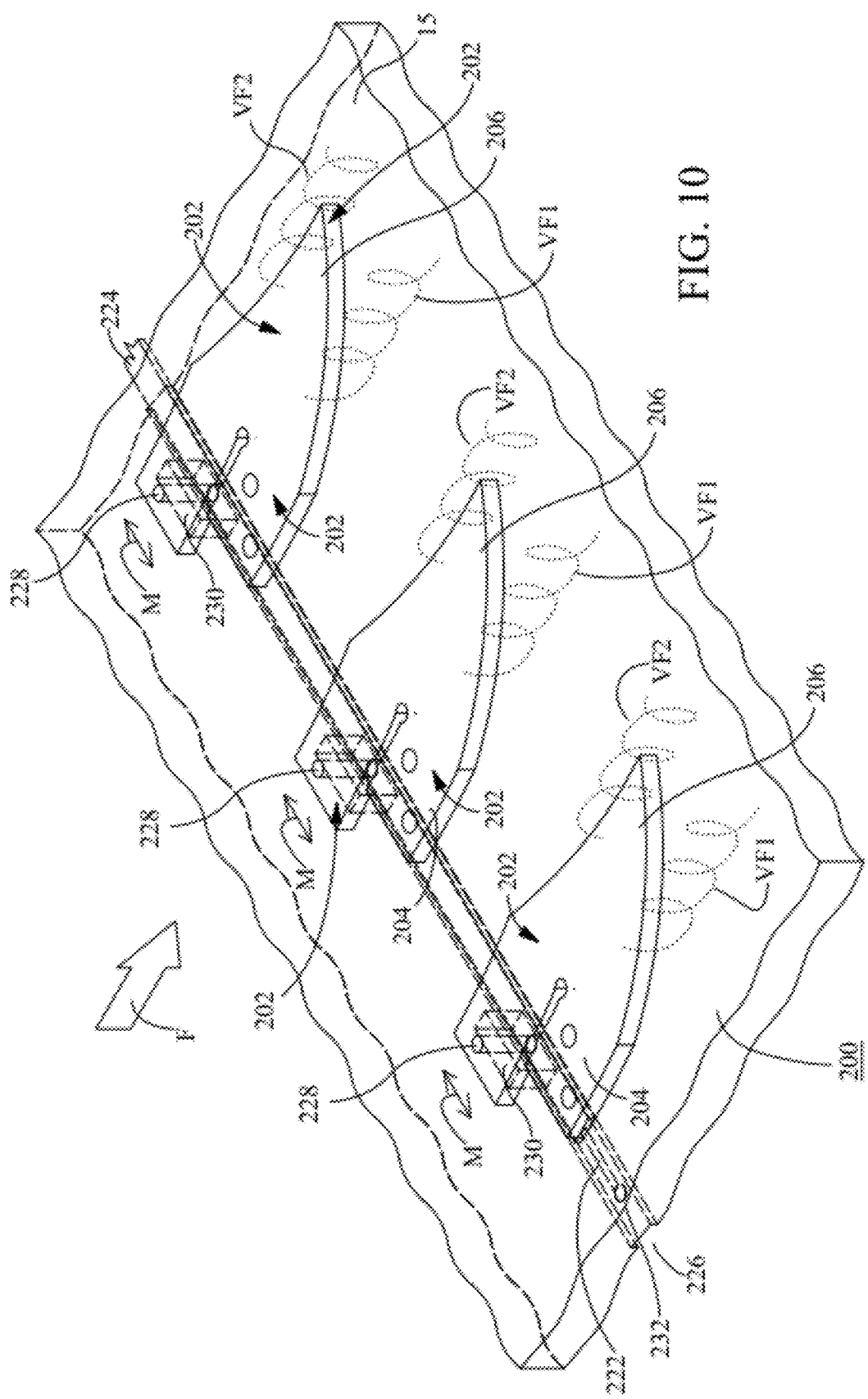
FIG. 10 is a perspective view of the vortex generators in FIG. 9 in a deployed position.

FIGS. 9 to 13 depict an embodiment of a controllable-position vortex generator array 200 that has been tested and proved effective in mitigating losses caused by interaction between a boundary layer in supersonic flow and a normal shock in a duct. FIG. 9 illustrates an array of the controllable-position vortex generators arranged in a row (truncated to show only part of the array) in their retracted position, in which they are substantially flush with the duct wall 15. FIG. 10 illustrates the vortex generators in their deployed position, in which they extend into the boundary later (not shown) along the duct wall 15. The vortex generators are attached to the inlet duct inner wall 15 and the flow direction is indicated by the arrow F. In the deployed position each vortex generator is believed to shed counter rotating vortices VF1 and VF2, as discussed above and depicted notionally in FIG. 10.

FIG. 11 is a top plan view of the array 200 seen in FIGS. 9 and 10, but with the vortex generators shown in phantom dot-dash lines for a clearer view of the actuating mechanism used to control the position of the vortex generators as discussed in detail further below. Referring to FIGS. 9 to 11, each vortex generator comprises a flap 202. The same material choices mentioned above in connection with the two-position vortex generator 100 are applicable to the present embodiment. Each flap 202 comprises a first portion 204 with one leg 204*a* that is securely attached to the duct wall 15 and an isosceles triangular second active, portion 206 that is movable between the retracted position (FIG. 9) and a deployed position (FIG. 10). As best seen in the plan view of FIG. 11, the first portion 204 also includes a second leg 204*b* that is not attached to the duct wall 15, and a keyhole-shaped cutout 208 that separates the first and second legs 204*a* and 204*b*. The cutout 208 ends at a terminus 210 that is generally circular, having a radius slightly larger than the width of the cutout 208. This enlarged portion 210 at the inside end of the cutout prevents stress concentration at the inside end of the cutout 208 that would otherwise be present if the slot ended in a sharp inside corner.

The first leg 204*a* of each flap 202 is secured to the duct wall 15 by fasteners 212 and 214. The fasteners 212 and 214 can take any suitable form that securely attaches the first leg 204*a* to the duct wall 15 and prevents the flap 202 from rotating relative to the duct wall in the plane of the flap. Examples of fasteners believed to be suitable for the purpose in an operational turbine engine inlet diffuser would be rivets, screws (suggested in the figures here), any one of a variety of types of specialty aerospace fasteners known to those skilled in the art, and adhesives (especially in the case where the flaps 202 comprise a composite material). The second leg 204*b* of the flap's first portion 204 is movable back and forth in the plane of the flap in the direction of the double-headed arrows M, as discussed in detail further below. A salient feature of the present embodiment is that moving the second leg 204*b* in the plane of the flap 202 causes the movable, active portion 206 to bend up or down by an amount determined by the amount the second leg is moved in the plane of the flap, to create an actuatable, active portion 206 that can be moved into any desired position within its range of motion.

The present embodiment further includes an actuating mechanism 220 that comprises a shape-memory alloy actuating member 222 attached to an actuating rod 224 mounted to slide within a groove 226 in the underside of the duct wall 15. As shown particularly in FIG. 12, a pin 228 connects the second leg 204*b* of each flap 202 to the actuating rod through a corresponding slot 230 in the duct wall 15. One end of the actuating rod 224 attaches to an end of the SMA actuating member 222, the other end of the SMA member 222 being suitably anchored at a location 232 beyond the last vortex generator in the array row 200. A displacement detector 234 provides an electrical signal that varies according to the amount the actuating rod moves in the groove 226. A displacement detector suitable for the purpose is a linear-variable displacement detector that produces a DC voltage (DC-LVDT) that is a linear function of the displacement of a push rod 235 that slides within an armature. The end of the actuating rod 224 remote from the end to which the SMA wire 222 is attached moves the DC-LVDT push rod 235 so that linear movement of the actuating rod produces a DC voltage proportional to the actuating rod displacement. The SMA actuating wire is maintained in tension so that heating it causes it to contract and move the actuating rod to the right as seen in FIG. 11. This in turn deflects the active portion 206 of the flap into the flow, as seen if FIG. 10. Close inspection of FIGS. 9 to 11 will reveal that FIGS. 10 and 11 show the pin 228 moved to the right in the slots 230 and the cutout 208 is narrower, as compared to the depiction in FIG. 9 showing the vortex generators in their retracted position. The flaps are manufactured with a slight "concave up" configuration to ensure that movement of the pin to the right deforms the flap into its deployed position.

Figure 13:
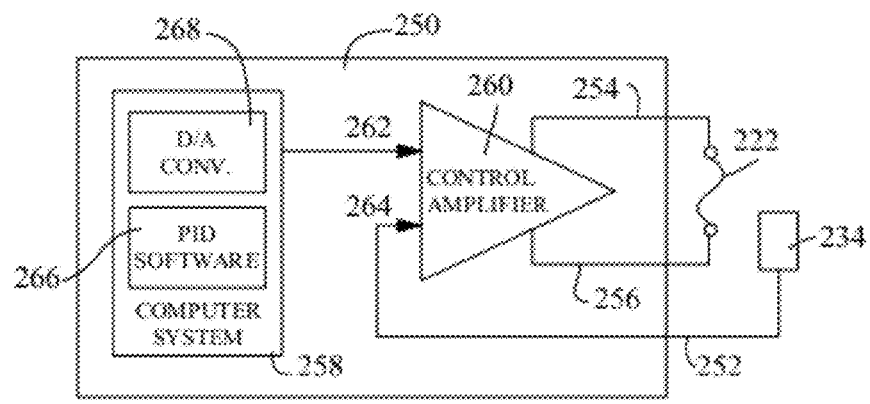
FIG. 13 is a schematic of a circuit diagram for controlling the position of the vortex generators shown in FIGS. 9 and 10.

A closed-loop control system 250 accepts the DC voltage from the DC-LVDT detector on a line 252, and provides an electrical output on lines 254 and 256 that introduce a current to the SMA actuator wire 222. FIG. 13 is a schematic circuit diagram for the control circuit 250, which includes a computer system 258 and a control differential amplifier 260. The control amplifier includes a first input 262 that accepts a set point signal from the computer system 228 and a second input 264 that accepts the feedback signal input from the displacement detector 234 on the line 252 indicative of the position of the actuating rod 224. In conventional fashion the amplifier generates an error signal that is converted to a current output on the leads 254 and 256 to increase or decrease the current supplied to the SMA actuating wire 222 so as to reduce the error signal to zero, meaning that the actuating rod 224 is in the desired position according to the set point signal from the computer system 258. Thus, the actuating mechanism is arranged for placing each actuated flap in its retracted position and in one of a plurality of deployed positions in which the active portion of the flap can be made to extend different distances into the air flow.

In more detail, the computer system 258 includes a conventional proportional-integral-derivative ("PID") controller 266 that establishes a set point representing the desired position of the active portions 206 of the flaps 202 in the vortex generator array 200. In situ testing can be used to determine the effect that various flap positions have on the shock wave boundary layer interaction and to determine software algorithms that correlate desired deployment heights of individual flaps or groups of flaps with different engine operating conditions. This could entail pre-installation testing of the array of flow control devices analogous to known procedures used to determine scheduled deployment and movement of components of the inlet shown in FIG. 3. Such testing is necessary in a supersonic engine inlets in which movement and angular positioning of the inlet ramp portions 24 and 26 are employed to control the strength of shock waves within the diffuser and, by extension, conditions at the diffuser exit to the compressor. Part of this testing would include determining the desired amplitude of deflection of the flow control devices for particular operating conditions. Pre-test characterization of the deployment mechanism and its power supply system would allow determination of particular set points to be applied for each of the relevant engine operating conditions. A digital-to-analog converter 268 converts the set point provided by the PID software to a corresponding voltage for input to the amplifier 260.

Figures 14, 15:
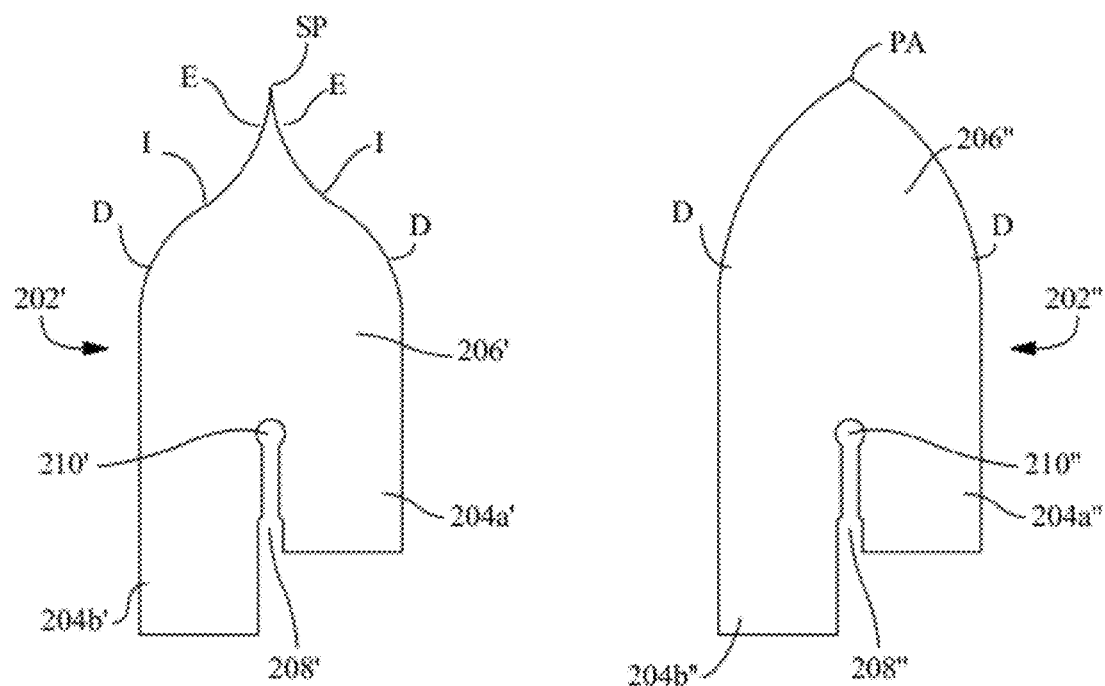
FIG. 14 is a top view of a first alternate planform of the controllable-position vortex generator shown in FIGS. 9 to 11.
FIG. 15 is a top view of a second alternate planform of the controllable-position vortex generator shown in FIGS. 9 to 11.

The present embodiment enables many variations in the configuration of each flap and the manner in which the flaps are arrayed and actuated. For example, the planform of the active portion of a flap can be rectangular rather than triangular in other applications. It can also have other planforms, two examples of which are shown in. FIGS. 14 and 15. Parts of the flap in FIG. 14 that generally correspond to parts of the flap described above are denoted with a prime ('), and in similar fashion parts in FIG. 15 are denoted with a double prime ("). In FIG. 14 the flap 202' has an active portion 206' with an inflected curved shape presenting a symmetrical "wishbone" planform to the flow. That is, the sides of the flap proximate to its downstream end curve inwardly at a location D, and then at an inflection point I curve concavely in the reverse direction E to form a sharp point SP. In FIG. 15 the flap 202" has an active portion 206" with an ogive shape presenting a convex, pointed arch planform. In this variation the sides of the flap proximate to its downstream end curve inwardly at a location D and form a point PA. These shapes in essence represent points in a continuum between a rectangular shape that has a constant width and a very narrow pointed shape that would cause little or no variation in the flow. It is anticipated that such shapes will induce flow disturbances (such as vorticity) in different ways that could prove advantageous for boundary layers in particular applications. The flaps 202' and 202" are mounted to the duct wall 15 and to the actuating rod 224 in the same fashion and facing in the same direction relative to the flow as flap 202 described above.

As with the previously described two-position embodiment, the size or sizes of the flaps in any given application will likely be determined empirically, and it will be understood that typically more than one array 200 is disposed in the inlet duct 16 as shown notionally in FIG. 1 (or FIG. 2). Such an array can assume various forms, such as a plurality of rows similar to the row array 200, but testing was performed at M=1.4 with a single-row array of three identical controllable position vortex generators in the same wind tunnel described above. The flaps had an isosceles triangular planform (as shown in FIGS. 9 to 11), with the active portion of each being 0.5" wide (transverse to the flow direction) at the base of the triangle. The flaps were 1.15" long overall, and measured 0.60" from the cutout terminus 210 to the upstream tip of the flap. The flaps were made of stainless steel with a thickness of 0.005". The shape-memory alloy wire 222 was of the same material as in the test of the two-position embodiment described above, with a diameter of 0.015". Measurements and Schlieren photographs (see FIGS. 16 and 17 and the accompanying discussion below) were taken with the flaps deployed to heights of 2 mm and 3 mm, which was about 0.4 and 0.6 of the boundary layer thickness, respectively.

While the invention is not subject to particular deployment height limitations, it is expected that deployments up to about 0.6 of the boundary layer height at the vortex generator location will be sufficient to attenuate adverse SBLI effects. It is also expected that a minimum deployment of about 0.4 of the boundary layer height will be required for that purpose. Of course, one of the advantages of the present controllable-position embodiment of the invention is that optimum deployment heights can be chosen for particular flight conditions and different vortex generators in an array can be deployed to different heights, as discussed in more detail below. It is also believed that the angle of the flaps when at their fully deployed height would form at their tips an angle of between about 15° to 30° with the duct wall. It is also expected that flaps with a pointed or tapering tip (such as the triangular, wishbone, or ogive shapes in FIGS. 11, 14, and 15, respectively) will provide better results in attenuating SBLI effects than flaps with a blunter tip, such as a flap having a rectangular planform, although the invention is not limited to flaps with a particular shape or shapes. In fact, it is believed part of the reason that the two-position embodiment discussed in the previous section proved particularly efficacious was because its three-dimensional shape when deployed had the effect of presenting a tapered planform to the flow.

FIG. 16 is a series of Schlieren photographs taken during the testing referred to above that demonstrate the efficacy of the present invention. By way of orientation, the ordinate y/δ in the photographs represents the distance from the wind tunnel test section floor normalized to the boundary layer thickness δ at the location of the control devices. In other words, y is the distance from the test section floor and δ is the boundary layer thickness at the chosen location in the same units used to measure the distance from the test section floor. The abscissa is an expression of the distance upstream from the normal shock, also normalized to the boundary layer thickness, where $x_d$ is the location measured from an arbitrary location to the location in the test section where the floor is inclined as shown in the photographs to induce the formation of the normal shock under nominal operating conditions (set by a flow control valve upstream of the wind tunnel test section). The entrance to this inclined section is the diffuser location and mimics the location in a supersonic inlet diffuser where the area begins to increase, as shown in FIG. 3. The distance x is measured upstream from the diffuser location in the same units. By way of example, note that $(x-x_d)=0$ at the normal shock. It should be noted in passing that the normal shock may not form at the diffuser location under all operating conditions, a factor taken into account in the tests results presented in FIG. 17 and discussed further below.

Figure 16A:
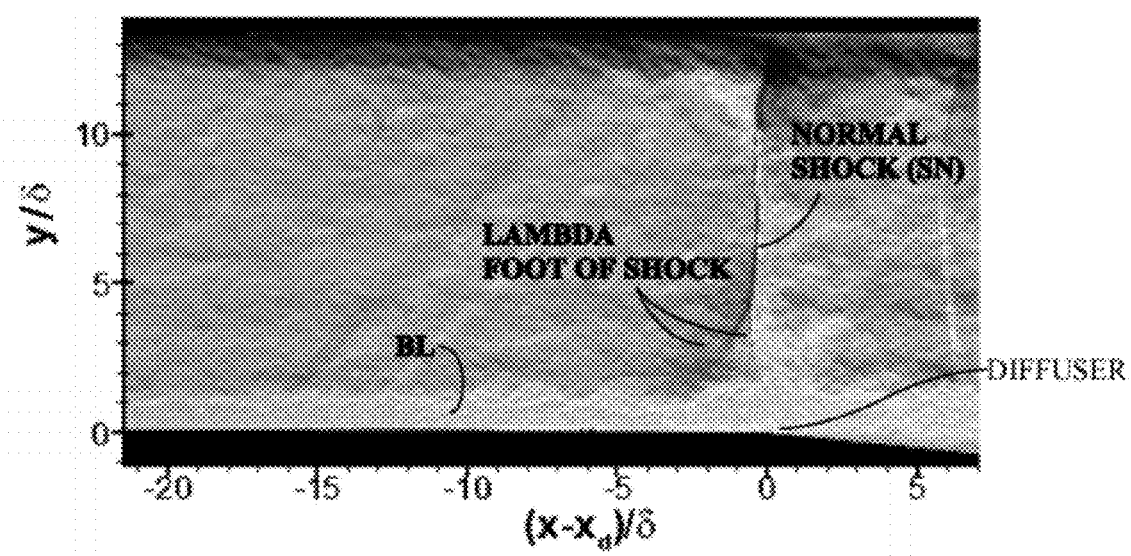
FIGS. 16A to 16D, is a series of Schlieren photographs of wind tunnel tests with no vortex generators, prior art vortex generators, and controllable-position vortex generators in accordance with the present invention.
Figure 16B:
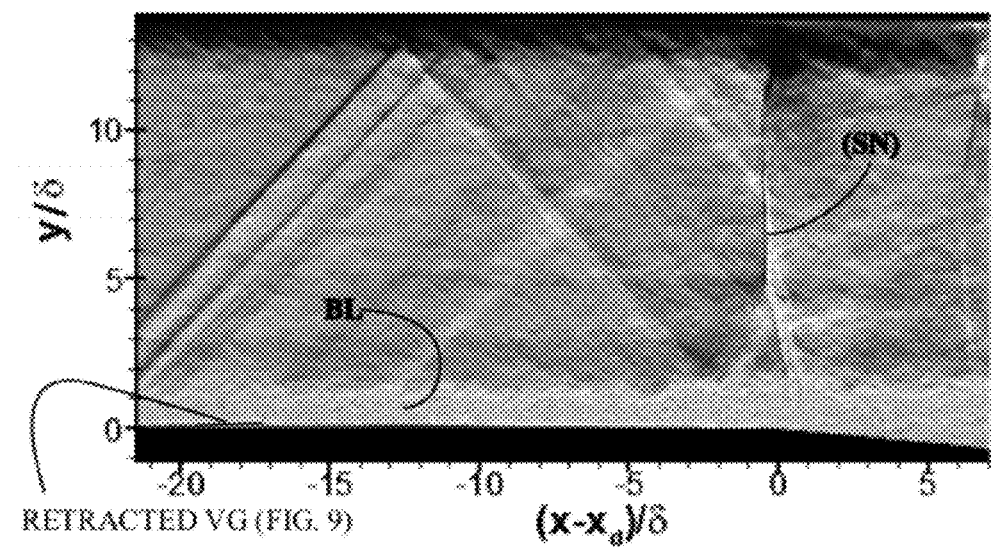
Figure 16C:
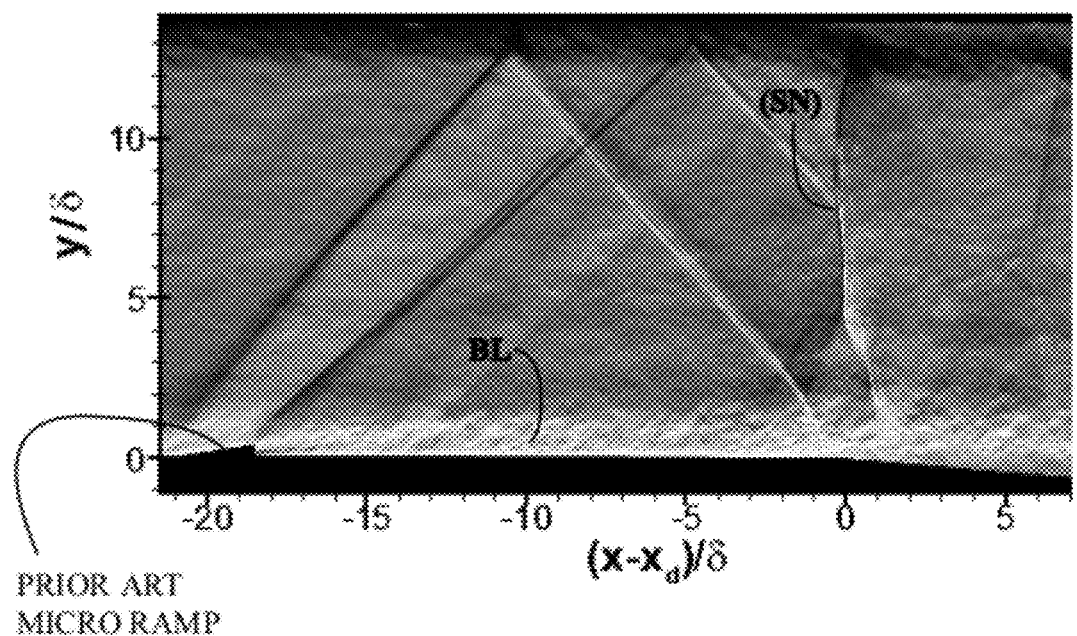
Figure 16D:
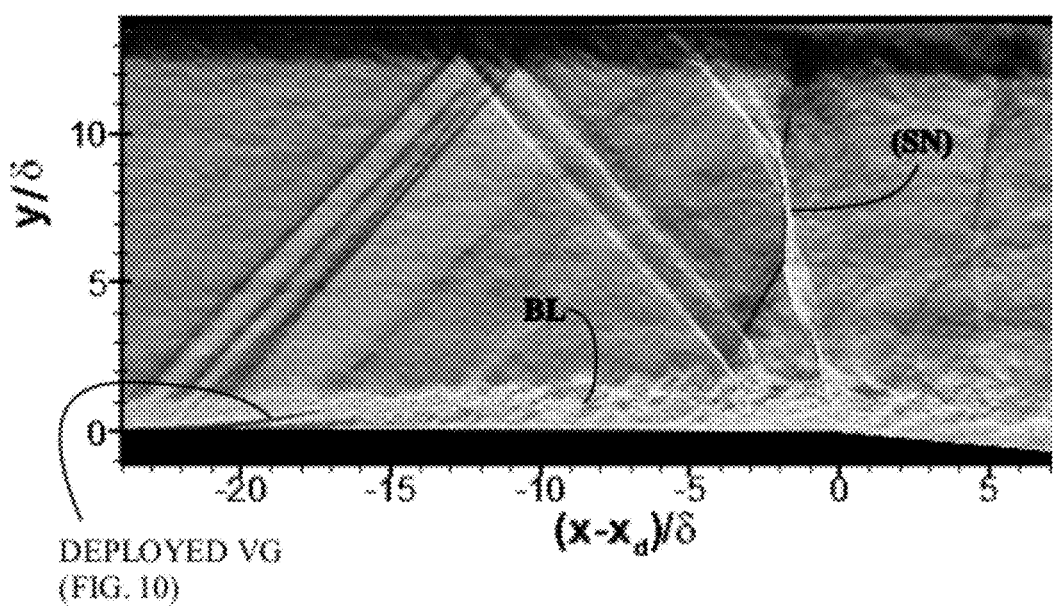

FIG. 16A shows the test section of the wind tunnel with no vortex generators installed. FIG. 16B shows the test section having therein the triangular controllable-position vortex generators discussed above, but in their retracted positions (FIG. 9). This photograph shows that the flow is essentially the same as in FIG. 16A. In other words, flow control devices in accordance with the present invention, when retracted, provide essentially the same flow conditions as when there are no vortex generators. FIG. 16C shows the flow in the test section under identical conditions, except for the presence of fixed micro-ramp vortex generators as described in the prior art (FIG. 1 of Herges). FIG. 16D shows the test section under the same conditions, but with the prior art vortex generators replaced with flaps having the same dimensions and deployed into the flow (see FIG. 10). In the photographs in FIG. 16, the prior art micro-ramps (FIG. 16C) and the flow control devices of the present invention (FIG. 16D) both extended 2 mm into the flow. Tests were also performed with the prior art micro-ramps and the flow control devices of the present invention extending 3 mm into the flow, with essentially the same results.

Figure 17:
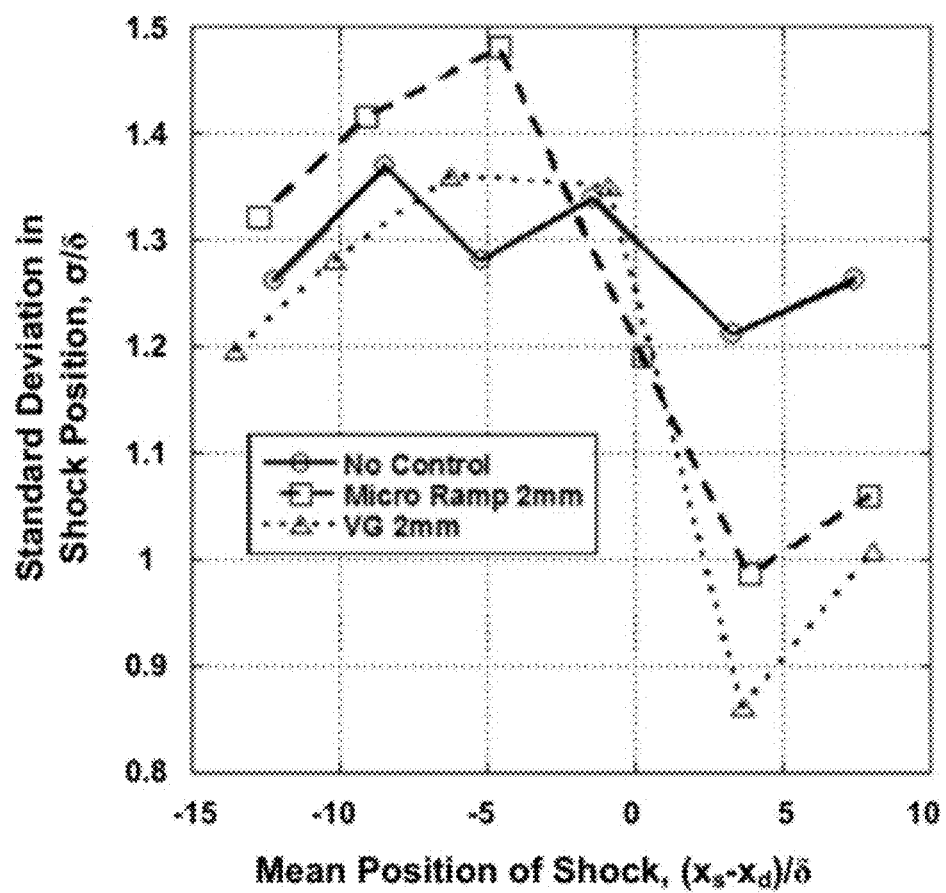
FIG. 17 is a graph that quantitatively compares the performance in the same wind tunnel tests of deployed flow control devices according to an embodiment of the invention, no vortex generators, and prior art vortex generators.

FIG. 17 presents a plot of test results that illustrate more quantitatively the advantages of the present invention. One of the important goals of any SBLI flow control device is to decrease in the amount the shock position varies in the streamwise direction for a given stagnation pressure, thereby increasing shock position stability. As noted above, the stagnation pressure is set by a valve upstream of the wind tunnel test section. The position of the normal shock varies according to the stagnation pressure, which simulates varying engine operating conditions encountered in an actual supersonic inlet diffuser. A nominal stagnation pressure induces the normal shock to form at the diffuser. Lower stagnation pressures cause the shock to move upstream and higher stagnation pressures cause it to move downstream. The shock at any given position actually fluctuates about a mean location at a certain frequency due to the turbulence of the flow, and the amount of variation about the mean location is a measure of the shock position stability. The magnitude of the standard deviation in the shock position from its mean location is an indicator of the flow stability; larger magnitudes are more likely to induce flow instabilities from SBLI effects that can cause engine performance problems such as compressor stall and surge and "compressor buzz," as mentioned above.

FIG. 17 plots the standard deviation σ in shock position (normalized to the boundary layer thickness δ at the location of the control devices) for a range of mean shock positions upstream and downstream of the entrance to the diffuser in the test section. The abscissa in FIG. 17 corresponds to that in FIG. 16, where $x_s$ is the mean shock location relative to the diffuser location $x_d$. The solid line with circular symbols represents a case with no flow control devices present. The line with large dashes and square symbols represents the test results with 2 mm high prior art micro-ramps, and the line with small dashes and triangular symbols represents the measurements with deployable flow control devices (FIG. 10) at a 2 mm height.

FIG. 17 shows that the prior art micro-ramps display a smaller (that is, more favorable) standard deviation than the no-control case when the stagnation pressure forces the normal shock downstream of the diffuser entrance, although upstream of the diffuser the standard deviation is actually larger (that is, less favorable) than in the no-control case. On the other hand, the controllable-position flow control devices deployed at the same height yield approximately the same standard deviation in the shock position as the no-control case for normal shocks upstream of the diffuser, while at stagnation pressures that produce shocks downstream of the diffuser the standard deviation in shock position is smaller than for the prior art micro-ramps and the no-control case. Thus, in addition to providing a previously unavailable ability to deploy and retract flow control devices, thereby providing an operational flexibility heretofore unknown (see next section), the present invention is also capable of a superior level of flow control.

Array Configuration and Actuation Options

As opposed to previously known fixed geometry vortex generators such as those described in Herges, Anderson, and the patents mentioned in the background section above, the present invention permits the use of different configuration vortex generators at different parts of an array and have them actuatable according to a schedule that is determined by flight conditions, while providing the same advantageous results as the prior art fixed geometry vortex generators.

By way of one, example, it has already been noted that vortex generators as described above can be arrayed in multiple rows arranged transverse to the flow direction, as is described in the prior art. That is, instead of the single rows shown in FIGS. 1 and 2, multiple such rows can be arranged in an array one behind the other in the flow direction. Thus, predetermined vortex generators in an array can be separately actuatable according to algorithms that take into account different flight conditions or different operational regimes of the aircraft engine with which they are used. Further operational versatility can be provided by using two-position vortex generators as described herein in combination with controllable-position generators.

Shape-Memory Alloy Considerations

There are many known materials that exhibit the shape-memory properties discussed above and in U.S. Pat. Nos. 5,752,672 and 6,220,550. One commercially available SMA is a nickel-titanium alloy of about 50% Ni and 50% Ti. However, in the application for the present subject matter discussed above, namely as an actuating mechanism for a deployable/retractable/controllable vortex generator in a supersonic engine inlet diffuser, the temperatures at which the SMA material changes state may be within the range of temperatures encountered in the engine inlet diffuser. Thus, although more conventional NiTi alloys may be suitable for other applications of the vortex generators described herein, specially adapted SMA materials may be required for use in a turbine engine supersonic inlet diffuser.

SMA materials are principally composed of nickel and titanium, although it is known to include doping materials resulting in ternary or in some cases quaternary alloys to enhance selected material properties such as transition temperature. As previously noted, SMAs can reversibly assume either of a high temperature "austenite" phase or a low temperature "martensite" phase. Transition between the austenite and martensite phases is typically accomplished through temperature change. With NiTi alloys direct ohmic heating is a popular and robust way to control the shape-memory effect. Phase transformation temperatures over a range of temperatures are available, depending on the particular alloy used. The martensite phase for most SMA materials typically occurs at room temperature, with the transition temperature occurring at approximately 160° F. for the most common commercially available 50/50 NiTi alloy.

While there have been numerous investigations of SMAs and their use in a variety of aerospace applications, of particular relevance here is recent research that has established a substantial base of engineering data and device performance using SMA actuation, including extensive materials testing (such as wire stress/strain analysis, repeatability, and sensitivity to thermal environment), generation of aero/thermo/elastic models for airfoil and hydrofoil deflection with embedded actuators, integration studies for candidate actuator designs, as well as results from benchtop, wind tunnel, and water tunnel testing of prototypes. Relevant studies in these regards are discussed in Carpenter, B. F., et al. "Shape Memory Actuated Spacecraft Mechanisms," AAS 96-065 (1996), Maclean, B. J., et al., "Shape-Memory-Actuated Compliant Control Surface," SPIE Smart Structures and Materials 1993: Smart Structures and Intelligent Systems, Albuquerque, N. Mex., SPIE, 1993, Quackenbush, T. R., et al., "Design, Fabrication, and Test Planning for an SMA-Actuated Vortex Wake Control System," Proc. of the SPIE Industrial and Commercial Applications of Smart Structures Technologies Meeting, SPIE, 1998, Quackenbush, T. R., et al., "Test Results for an SMA-Actuated Vortex Wake Control System," in SPIE Smart Structures and Materials 1999: Industrial and Commercial Applications of Smart Structures Technologies, SPIE, 1999, Quackenbush, T. R., et al., "Novel Turning Device Via Smart Material Technology," Final Report to the U.S. Navy under contract N00014-01-C-0318, April 2004, Quackenbush, T. R., et al., "Cost Effective On Demand Flow Control with Shape Memory Alloy Actuators," Final Report to NASA under contract NAS1-02060, February 2005, and Quackenbush, T. R., et al., "Development and Test of a IITSMA Supersonic Ramp Actuator," SPIE Smart Materials and Structures, April 2008.

Even though the ability of SMA-actuated devices to function effectively under high dynamic pressures, at high subsonic Mach numbers, and in water has been demonstrated in prior applications, the sensitivity of SMA actuation devices to high temperatures must also be addressed. Given that the bulk of most commonly used NiTi actuation materials have transition temperatures under 100° C., this limitation can pose a strong challenge to the use of SMAs for adaptive flow control in high temperature propulsion applications, where surface temperatures can exceed 200° C. or more, even in relatively "cool" inlet spaces. Since many other applications also require transformation temperatures for SMA actuators well above that of the baseline NiTi alloy, there has been an increasing level of interest in High Temperature SMAs (HTSMAs) in recent years. Investigations in that respect are discussed in Fonda, R. W., et al., "Crystallography and Microstructure of TaRu," Philos. Mag. A., 76, pp. 119-133 (1997), Fonda, R. W., et al., "The Shape Memory Effect in Equiatomic TaRu and NbRu Alloys," Scripta Materialia, 39, pp. 1031-1037 (1998). Noebe, R. D., et al., "NiTi-Based High-Temperature Shape Memory Alloys: Properties, Prospects, and Potential Applications," NASA TM 2004-213104 (2004), and Van Humbeeck, J., "High Temperature Shape Memory Alloys," Trans. ASME, Journal of Eng. Materials and Technology 121, pp. 98-110 (1999). The list of alloys that exhibit shape memory behavior and which have higher transition temperatures than conventional NiTi include NiTiPd, NiTiPt, NiTiHf, NiTiZ, and Fe-based compositions. Limited phenomenological and transformation structure data for these alloys, however, has delayed widespread practical application. Also, a basic challenge is that mechanical properties can be degraded (for example, reduced work output and higher creep levels) for alloys operating at elevated temperatures.

To obtain higher transition temperatures without degrading mechanical properties, modifications to the NiTi system have been considered. Promising substitutions include use of Hf for Ti, and Pd or Pt for Ni. Austenite temperatures are increased using Hf substitution, but hysteresis tends to keep the martensite transformation temperature low. Hot compression test data has been measured to evaluate NiTi—Pd, in terms of its resistance to cracking and resistance to deformation. Ternary alloys have also been studied in considerable detail by investigators at NASA/GRC. See Noebe, R. D., "Properties and Potential of a $Ni_{30}Pt_{20}Ti_{50}$ Alloy for Use as a High Temperature Actuator Material," Preliminary White Paper, NASA/Glenn Advanced Metallics Branch, July 2004, and Noebe, R. D., "Processing of $Ni_{30}Pt_{20}Ti_{50}$ High-Temperature Shape-Memory Alloy into Thin Rod," http://www.grc.nasa.gov/WWW/RT/2004/RM/RM14M-noebe2.html (2005). Of these, the (Ni,Pd)Ti system has been the most thoroughly analyzed and has been judged promising in some key respects. Alloys with 20-40% Pd have a range of transformation temperatures from about 100° C. to 400° C., so that compositions can be tailored for a given application. Alloys in this composition range also exhibit good shape memory behavior and relatively a narrow thermal hysteresis, both favorable properties for actuators requiring active control. Results using the related group of (Ni,Pt)Ti alloys have also been encouraging in that they have the highest transformation temperatures of any of the NiTi based systems. In addition, work to date indicates that these alloys appear to be stable against thermal cycling effects, have a narrow hysteresis for compositions with less than 30% Pt, and seem to have relatively good high-temperature strength and to be suitable for use in actuation roles like those required in an application where the vortex generators are installed in the in the diffuser of a supersonic aircraft.

As described in Noebe's "Properties and Potential of a $Ni_{30}Pt_{20}Ti_{50}$ Alloy for use as a High Temperature Actuator Material," this alloy has been found to have particularly promising properties. Measured transformation temperatures for this "20-Pt" alloy were in the 250° C. range. While in the martensitic state the 20-Pt alloy has a tensile ductility of about 4%, which is much less than that of binary NiTi alloys, could still be sufficient for most applications. The maximum work capability appeared to be limited only by the tensile ductility of the material and to be comparable to typical binary NiTi alloys while exhibiting little hysteresis. This combination of high transition temperature, low hysteresis, and high work output makes this 20-Pt alloy of NiTi a very promising HTSMA for actuator applications like those described herein. (All of the references cited in this section are incorporated herein by reference.)

Summary and Conclusion

The present invention is directed to a deployable/retractable/controllable flow control device that is intended primarily to mitigate adverse SBLI effects in a supersonic inlet diffuser for an aircraft turbine engine. The flow mechanisms effecting this attenuation are similar to those obtained with prior art fixed geometry micro-ramps, but the flow control vortex generators disclosed and claimed herein provide operational versatility heretofore unknown in the prior art. Thus, important performance characteristics of the engine, such as efficiency and operational stability, can be achieved in a variety of flight conditions. Moreover, unlike prior art fixed geometry flow control devices, the schedules of operation of the inventive flow control devices can be adjusted for changes in engine configuration or aircraft mission.

It will be understood that the embodiments of the invention described above can be modified in myriad ways other than those specifically discussed without departing from the scope of the invention. For example, actuation mechanisms employing shape-memory alloy actuating members have been described above, but the invention is not so limited. An alternative, particularly in the above controllable-position embodiment, could employ any suitable mechanism, such as a digital stepping motor, for moving the actuating rod 224 in the slot 232. The invention encompasses all such alternatives consistent with the claims appended hereto.

Those skilled in the art will readily recognize that only selected preferred embodiments of the invention have been depicted and described, and it will be understood that various changes and modifications can be made other than those specifically mentioned above without departing from the spirit and scope of the invention, which is defined solely by the claims that follow.

What is claimed is:

1. An inlet diffuser for introducing air flow to a turbine engine, the diffuser comprising:

an inlet duct having a portion bounded by mutually facing duct walls for accepting air traveling at a velocity in excess of the speed of sound in the air (M >1) and passing air flow traveling in said duct at M >1 through a shock front between said facing duct walls at a location in said inlet duct upstream of the turbine engine to decelerate the air flow to a velocity less than the speed of sound in the air (M <1), wherein a boundary layer proximate to at least one duct wall of said facing duct walls interacts with the shock front;

an array of a plurality of flow control devices disposed upstream of said location and arranged over an area of said at least one duct wall within said portion of said inlet duct, each of said plurality of flow control devices including a flap having a first portion attached to said at least one duct wall and an active portion movable between (i) a retracted position wherein said active portion is substantially flush with a region of said at least one duct wall adjacent said flap for minimizing disturbance of air flow in a boundary layer trailing each of said flow control devices, and (ii) a deployed position wherein said active portion extends a predetermined height above said region of said at least one duct wall for altering air flow in the boundary layer trailing each of said flow control devices that interacts with the shock front; and an actuating mechanism including a shape-memory alloy actuating member, said actuating mechanism being operatively connected to said flaps for deforming at least one of said flaps to effect movement of said active portion thereof between the retracted position and the deployed position.

2. An inlet diffuser as in claim 1, wherein:

said area of said at least one duct wall has a continuous surface, said active portion in the retracted position being disposed on top of said continuous surface substantially flush therewith and in the deployed position being disposed with a space between said active portion and said continuous surface; and said array of said plural flow control devices includes at least one said flap in which said active portion can assume only one of the retracted position and the deployed position when said flap is deformed by said actuating mechanism.

3. An inlet diffuser as in claim 2, wherein said active portion is confined in an elastically deformed condition and is movable between one stable position in which said active portion is elastically deformed for holding said active portion in one of the retracted position and the deployed position and another different stable position in which said active portion is elastically deformed for holding said active portion in the other of the retracted position and the deployed position; and said shape-memory alloy actuating member includes at least two shape-memory alloy actuating wires operatively attached in tension between said active portion and said at least one duct wall, one said actuating wire being elongated when said active member is in one of its stable positions so that heating said one wire contracts it and moves said active portion to its other stable position and elongates the other said actuating wire.

4. An inlet diffuser as in claim 3, wherein said active portion includes a flat body member and said first portion includes a pair of flat tongues attached to said at least one duct wall, said tongues being integral with said body member and attached thereto an end of said tongues spaced from where they are attached to said at least one duct wall so that said flap is elastically deformed substantially in the plane thereof to elastically buckle said body member out of the plane thereof, said body member being elastically buckled in a first direction in one stable position thereof and being elastically buckled in a second direction in the other stable position thereof.

5. An inlet diffuser as in claim 4, wherein:
said flap has a trapezoidal planform with parallel sides of the trapezoid aligned generally with the direction of the air flow, one of the parallel sides having a cutout forming said tongues and one of the nonparallel sides of the trapezoid being perpendicular to the parallel sides and disposed at the downstream end of said flap relative to the general direction of the air flow;
said actuating wires are attached to said flap proximate to the other of the parallel sides of the trapezoid; and
said flap in the retracted position is bent over a protuberance on said at least one duct wall.

6. An inlet diffuser as in claim 1, wherein said array of said plural flow control devices includes a plurality of said flaps, said active portion of each of which can assume the retracted position and any of a plurality of deployed positions at different heights above said region of said at least one duct wall adjacent said flap.

7. An inlet diffuser as in claim 6, wherein:
each said flap is elastically deformable and spaced from a flap adjacent thereto; and
said active portion of each said flap in the retracted position is disposed on top of a continuous surface of said at least one duct wall substantially flush therewith.

8. An inlet diffuser as in claim 7, wherein said active portion includes a flat body member and said first portion includes a first tongue attached to said at least one duct wall and a second tongue operatively attached to said actuating mechanism, said first and second tongues being attached to said body member at an end of said tongues opposite to where they are attached to said at least one duct wall and said actuating mechanism so that movement of said second tongue to a plurality of different positions elastically deforms said flap to move said active portion between said retracted position and a plurality of said deployed positions corresponding to different positions of said second tongue.

9. An inlet diffuser as in claim 8, wherein:
said shape-memory alloy actuating member is operatively attached to said second tongue of at least one said flap and held in tension; and
said actuating mechanism includes a control circuit for introducing electric current to said shape-memory alloy actuating member to cause it to contract and relax in accordance with a desired deployment position.

10. An inlet diffuser as in claim 9, wherein said actuating mechanism includes a closed-loop feedback control system for maintaining said active portion in a desired deployed position in accordance with an input to said control system.

11. An inlet diffuser as in claim 9, wherein said shape-memory alloy actuating member is operatively attached to said second tongue of each of plural said flaps.

12. An inlet diffuser as in claim 9, wherein said body member has a planform comprising an isosceles triangular shape having a base attached to said first and second tongues and straight sides disposed substantially symmetrically with the general direction of the air flow with the apex of the triangle downstream of the base.

13. An inlet diffuser as in claim 8, wherein said actuating mechanism can vary the height said active portion extends above said at least one duct wall to any desired height up to about 0.6 of the height of the boundary layer at the location of said flap.

14. An inlet diffuser as in claim 9, wherein said body member has a planform comprising a curved wishbone shape having a base attached to said first and second tongues and sides that in a direction downstream in the airflow direction curve inwardly and then at an inflection point curve concavely in the reverse direction to form a sharp point, said sides being disposed substantially symmetrically with the general direction of the air flow with the point of the wishbone downstream of the base.

15. An inlet diffuser as in claim 9, wherein said body member has a planform comprising a curved ogive shape having a base attached to said first and second tongues and sides that in a direction downstream in the air flow direction curve inwardly to form a convex, pointed arch planform, said sides being disposed substantially symmetrically with the general direction of the air flow with the point of the arch downstream of the base.

16. A method of controlling shock wave boundary layer interaction in an inlet diffuser according to claim 1, the method comprising moving active portions of selected said flaps between the retracted position and the deployed position.

17. A method of controlling shock wave boundary layer interaction in an inlet diffuser according to claim 6, the method comprising moving said active portions of selected said flaps to one of a plurality of deployed positions at different heights above said at least one duct wall.

* * * * *